(12) United States Patent
Maggard et al.

(10) Patent No.: US 11,472,713 B2
(45) Date of Patent: Oct. 18, 2022

(54) ALUMINUM OXIDE AEROGELS AND METHODS OF MAKING AND USE THEREOF

(71) Applicant: NORTH CAROLINA STATE UNIVERSITY, Raleigh, NC (US)

(72) Inventors: Paul Maggard, Raleigh, NC (US); Jerome J. Cuomo, Raleigh, NC (US); Keith Markham, Raleigh, NC (US); William Kiether, Raleigh, NC (US)

(73) Assignee: North Carolina State University, Raleigh, NC (US)

(\*) Notice: Subject to any disclaimer, the term of this patent is extended or adjusted under 35 U.S.C. 154(b) by 379 days.

(21) Appl. No.: 16/652,774

(22) PCT Filed: Oct. 3, 2018

(86) PCT No.: PCT/US2018/054138
§ 371 (c)(1),
(2) Date: Apr. 1, 2020

(87) PCT Pub. No.: WO2019/070835
PCT Pub. Date: Apr. 11, 2019

(65) Prior Publication Data
US 2020/0239326 A1    Jul. 30, 2020

Related U.S. Application Data

(60) Provisional application No. 62/567,915, filed on Oct. 4, 2017.

(51) Int. Cl.
*C01F 7/422* (2022.01)
*B01J 13/00* (2006.01)
(Continued)

(52) U.S. Cl.
CPC .............. *C01F 7/422* (2013.01); *B01D 53/62* (2013.01); *B01J 13/0091* (2013.01); *B01J 21/04* (2013.01);
(Continued)

(58) Field of Classification Search
CPC .......... C01F 7/422; C01F 7/021; B01D 53/62; B01D 2251/20; B01D 2257/504;
(Continued)

(56) References Cited

U.S. PATENT DOCUMENTS

2017/0080405 A1    3/2017 Cuomo

OTHER PUBLICATIONS

International Search Report and Written Opinion dated Dec. 14, 2018 in International Application PCT/US2018/54138 (9 pages).
(Continued)

*Primary Examiner* — Anita Nassiri-Motlagh
(74) *Attorney, Agent, or Firm* — Meunier Carlin & Curfman LLC

(57) ABSTRACT

Disclosed herein are aluminum oxide aerogels and methods of making and use thereof. The methods of making the aluminum oxide aerogel include contacting a solid comprising aluminum with a Ga-based liquid alloy to dissolve at least a portion of the aluminum from the solid, thereby forming an aluminum-alloy mixture; and contacting the aluminum-alloy mixture with a fluid comprising water, thereby forming the aluminum oxide aerogel. In some examples, the methods can further comprise capturing and converting carbon dioxide to a syngas comprising carbon monoxide and hydrogen.

19 Claims, 19 Drawing Sheets

(51) Int. Cl.
    *B01J 21/04* (2006.01)
    *B01J 37/12* (2006.01)
    *C01B 3/10* (2006.01)
    *C01F 7/021* (2022.01)
    *C22C 21/00* (2006.01)
    *C22C 28/00* (2006.01)
    *B01D 53/62* (2006.01)
    *B01J 37/08* (2006.01)

(52) U.S. Cl.
    CPC ............ *B01J 37/08* (2013.01); *B01J 37/12* (2013.01); *C01B 3/10* (2013.01); *C01F 7/021* (2013.01); *C22C 21/00* (2013.01); *C22C 28/00* (2013.01); *B01D 2251/20* (2013.01); *B01D 2257/504* (2013.01); *B01D 2258/0275* (2013.01); *B01D 2258/0283* (2013.01); *C01P 2002/82* (2013.01); *C01P 2002/88* (2013.01); *C01P 2004/03* (2013.01)

(58) Field of Classification Search
    CPC ..... B01D 2258/0275; B01D 2258/0283; B01J 13/0091; B01J 21/04; B01J 37/08; B01J 37/12; C01B 3/10; C22C 21/00; C22C 28/00
    USPC ........................................ 252/373
    See application file for complete search history.

(56) References Cited

OTHER PUBLICATIONS

International Preliminary Report on Patentability dated Apr. 16, 2020 in International Application PCT/US2018/54138 (7 pages).
Askhadullin et al. "Liquid metal technology of synthesis of AlOOH anisotropic nano structured aerogel." Nuclear Energy and Technology, 2017, 3(1), 43-48.
Effendi et al. "Steam reforming of a clean model biogas over Ni/Al2O3 in fluidized-and fixed-bed reactors." Catalysis Today, 2002, 181-189.
Fricke J. "Aerogels and their applications," Journal of Non-Crystalline Solids 1992, 147, 356-362.
Fricke et al. "Aerogels," Journal of the American Ceramic Society, 1992, 75(8), 2027.
Fricke et al. "Aerogels: production, characterization, and applications," Thin Solid Films, 1997, 297(1-2), 212-223.
Gardes et al. "Catalytic demonstration of hydrogen spillover from nickel-alumina catalyst to alumina," Journal of Catalysis, 1974, 33(1), 145-148.
Gesser et al. "Aerogels and related porous materials," Chemical Reviews, 1989, 89, 765-788.
Krompiec et al. "Nickel-alumina composite aerogel catalysts with a high nickel load: a novel fast sol-gel synthesis procedure and screening of catalytic properties," Journal of Non-Crystalline Solids, 2003, 315(3), 297-303.
Liu et al. "Characterization of nontoxic liquid-metal alloy Galinstan for applications in microdevices." Journal of Microelectromechanical Systems, 2012, 21(2), 443-450.
Markel et al. "Aerogel monoliths produced by direct oxidation of aluminum," Journal of Non-Crystalline Solids 1994, 180(1), 32-39.
Nguyen et al. "Syngas and synfuels from H2O and CO2: current status." Chemie Ingenieur Technik, 2015, 354-375.
Osaki et al. "Characterization of nickel-alumina aerogels with high thermal stability," Journal of Non-Crystalline Solids, 2009, 355(31-33), 1590-1596.
Pinnel et al. "Voluminous oxidation of aluminium by continuous dissolution in a wetting mercury film," Journal of Materials Science, 1972, 7, 1016-1026.
Sostman. "Melting point of gallium as a temperature calibration standard." Review of Scientific Instruments, 1977, 127-130.
Tchieda et al. "Removal of Arsenic by Alumina: Effects of Material Size, Additives, and Water Contaminants," Clean-Soil Air Water, 2016, 44(5), 496.
Vignes et al. "Ultraporous monoliths of alumina prepared at room temperature by aluminium oxidation," Journal of Materials Science, 2008, 43, 1234-1240.

ALUMINUM OXIDE AEROGELS AND METHODS OF MAKING AND USE THEREOF

CROSS-REFERENCE TO RELATED APPLICATIONS

This is a national stage application of PCT International Application No. PCT/US2018/054138, filed Oct. 3, 2018, which application claims priority to, and the benefit of, priority to U.S. Provisional Application No. 62/567,915, filed Oct. 4, 2017, which are hereby incorporated herein by reference in their entireties.

BACKGROUND

High-surface-area aluminum oxide aerogels comprising aluminum, such as amorphous or crystalline aluminum oxide, have been applied in various fields, such as the support for molecular catalysts and as an absorbent for pollutants. Traditionally, aluminum oxide aerogels have been synthesized by sol-gel technology, which requires complex supercritical drying techniques to remove the reaction solvent, because liquid surface tension forces will collapse the aerogel structure during evaporative drying steps. Attempts have been made in synthesizing aluminum oxide aerogels by direct oxidation of aluminum by wetting the aluminum surface with mercury film to grow an aluminum oxide aerogel monolith, but the high toxicity of mercury is a major limiting factor of this method. Methods of making aluminum oxide aerogels in the absence of solvents and toxic mercury are needed. The methods discussed herein address these and other needs.

SUMMARY

In accordance with the purposes of the disclosed compositions and methods, as embodied and broadly described herein, the disclosed subject matter relates to compositions and methods of making and using the compositions. More specifically, according to the aspects illustrated herein, disclosed are aluminum oxide aerogels and methods of making and use thereof. In some examples, the methods can further comprise capturing and converting carbon dioxide to a syngas comprising carbon monoxide and hydrogen.

Additional advantages of the disclosed compositions and methods will be set forth in part in the description which follows, and in part will be obvious from the description. The advantages of the disclosed compositions will be realized and attained by means of the elements and combinations particularly pointed out in the appended claims. It is to be understood that both the foregoing general description and the following detailed description are exemplary and explanatory only and are not restrictive of the disclosed compositions, as claimed.

The details of one or more embodiments of the invention are set forth in the accompanying drawings and the description below. Other features, objects, and advantages of the invention will be apparent from the description and drawings, and from the claims.

BRIEF DESCRIPTION OF THE FIGURES

The accompanying figures, which are incorporated in and constitute a part of this specification, illustrate several aspects of the disclosure, and together with the description, serve to explain the principles of the disclosure.

DETAILED DESCRIPTION

Figure 1:
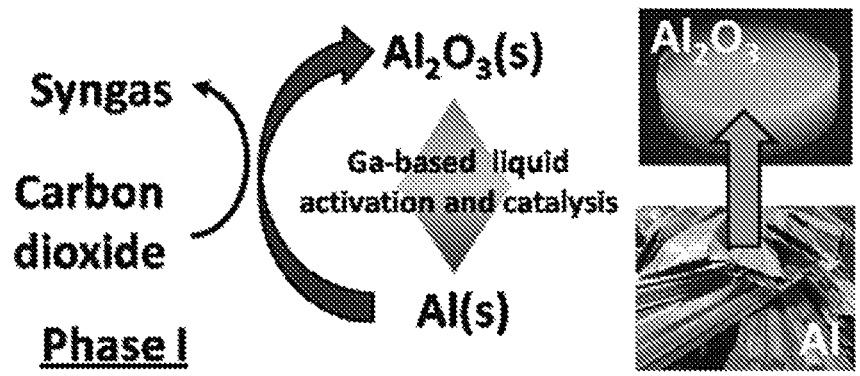
FIG. 1 is a schematic illustration of biofuel production and synergistic formation of an aluminum oxide aerogel from aluminum metal.

The compositions and methods described herein may be understood more readily by reference to the following detailed description of specific aspects of the disclosed subject matter and the Examples included therein.

Before the present compositions and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

In this specification and in the claims that follow, reference will be made to a number of terms, which shall be defined to have the following meanings.

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "an agent" includes mixtures of two or more such agents, reference to "the component" includes mixtures of two or more such components, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. By "about" is meant within 5% of the value, e.g., within 4, 3, 2, or 1% of the value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

It is understood that throughout this specification the identifiers "first" and "second" are used solely to aid in distinguishing the various components and steps of the disclosed subject matter. The identifiers "first" and "second" are not intended to imply any particular order, amount, preference, or importance to the components or steps modified by these terms.

Disclosed herein are methods of making aluminum oxide aerogels. The methods comprise contacting a solid comprising aluminum with a Ga-based liquid alloy to dissolve at least a portion of the aluminum from the solid, thereby forming an aluminum-alloy mixture.

The solid can, for example comprises 85% or more of aluminum (e.g., 86% or more, 87% or more, 88% or more, 89% or more, 90% or more, 91% or more, 92% or more, 93% or more, 94% or more, 95% or more, 96% or more, 97% or more, 98% or more, or 99% or more).

In some examples, the solid can comprise 100% or less of aluminum (e.g., 99% or less, 98% or less, 97% or less, 96% or less, 95% or less, 94% or less, 93% or less, 92% or less, 91% or less, 90% or less, 89% or less, 88% or less, 87% or less, or 86% or less). The amount of aluminum in the solid can range from any of the minimum values described above to any of the maximum values described above. For example, the solid can comprise from 85% to 100% of aluminum (e.g., from 85% to 93%, from 93% to 100%, from 85% to 90%, from 90% to 95%, from 95% to 100%, or from 97% to 98%).

In some examples, the solid can further comprise one or more alloying elements selected from the group consisting of Mg, Zn, Cu, Fe, Si, Ti, Mn, Cr, and combinations thereof. For example, the solid can comprise an aluminum alloy, such as aluminum alloy 2024, aluminum alloy 7075, or a combination thereof. In some examples, the aluminum alloy can comprise a waste component from the aerospace industry, boat and ship building industries, off-shore marine construction, building industries, and tubulars used in the oil and gas industry. As such, the methods described herein can comprise methods of recycling waste components comprising aluminum into an aluminum oxide aerogel.

As used herein, a Ga-based liquid alloy is any alloy comprising Ga that is liquid at a temperature of from 25° C. to 250° C. That is, at one or more temperature ranges or points from 25° C. to 250° C. the Ga-based alloy is liquid; although it is understood that they can be solids at other temperature ranges or points. For example, the Ga-based liquid alloy can be liquid at a temperature of 25° C. or more (e.g., 26° C. or more, 27° C. or more, 28° C. or more, 29° C. or more, 30° C. or more, 35° C. or more, 40° C. or more, 45° C. or more, 50° C. or more, 60° C. or more, 70° C. or more, 80° C. or more, 90° C. or more, 100° C. or more, 125° C. or more, 150° C. or more, 175° C. or more, 200° C. or more, or 225° C. or more). In some examples, the Ga-based liquid alloy can be a liquid at a temperature of 250° C. or less (e.g., 225° C. or less, 200° C. or less, 175° C. or less, 150° C. or less, 125° C. or less, 100° C. or less, 90° C. or less, 80° C. or less, 70° C. or less, 60° C. or less, 50° C. or less, 45° C. or less, 40° C. or less, 35° C. or less, or 30° C. or less). The temperature at which the Ga based alloy is liquid can range from any of the minimum values described above to any of the maximum values above. For example, the Ga-based liquid alloy can be a liquid at a temperature of from 25° C. to 250° C. (e.g., from 25° C. to 150° C., from 150° C. to 250° C., from 25° C. to 200° C., from 25° C. to 100° C., from 25° C. to 80° C., from 25° C. to 50° C., from 25° C. to 45° C., from 25° C. to 40° C., from 25° C. to 35° C., or from 25° C. to 30° C.).

The Ga-based liquid alloy can comprise any liquid alloy comprising Ga capable of dissolving aluminum. In some examples, the aluminum can be dissolved at a rate of $1 \times 10^3$ mg cm$^{-2}$ h$^{-1}$ or more by the Ga-based liquid alloy (e.g., $2\times10^3$ mg cm$^{-2}$ h$^{-1}$ or more, $3\times10^3$ mg cm$^{-2}$ h$^{-1}$ or more, $4\times10^3$ mg cm$^{-2}$ h$^{-1}$ or more, $5\times10^3$ mg cm$^{-2}$ h$^{-1}$ or more, $6\times10^3$ mg cm$^2$ h$^{-1}$ or more, $7\times10^3$ mg cm$^{-2}$ h$^{-1}$ or more, $8\times10^3$ mg cm$^{-2}$ h$^{-1}$ or more, $9\times10^3$ mg cm$^{-2}$ h$^{-1}$ or more, $1\times10^4$ mg cm$^{-2}$ h$^{-1}$ or more, $2\times10^4$ mg cm$^{-2}$ h$^{-1}$ or more, $3\times10^4$ mg cm$^{-2}$ h$^{-1}$ or more, $4\times10^4$ mg cm$^{-2}$ h$^{-1}$ or more, $5\times10^4$ mg cm$^{-2}$ h$^{-1}$ or more, $6\times10^4$ mg cm$^{-2}$ h$^{-1}$ or more, $7\times10^4$ mg cm$^{-2}$ h$^{-1}$ or more, $8\times10^4$ mg cm$^{-2}$ h$^{-1}$ or more, or $9\times10^4$ mg cm$^{-2}$ h$^{-1}$ or more). In some examples, the aluminum can be dissolved at a rate of $1\times10^5$ mg cm$^{-2}$ h$^{-1}$ or less by the Ga-based liquid alloy (e.g., $9\times10^4$ mg cm$^{-2}$ h$^{-1}$ or less, $8\times10^4$ mg cm$^{-2}$ h$^{-1}$ or less, $7\times10^4$ mg cm$^{-2}$ h$^{-1}$ or less, $6\times10^4$ mg cm$^{-2}$ h$^{-1}$ or less, $5\times10^4$ mg cm$^{-2}$ h$^{-1}$ or less, $4\times10^4$ mg cm$^{-2}$ h$^{-1}$ or less, $3\times10^4$ mg cm$^{-2}$ h$^{-1}$ or less, $2\times10^4$ mg cm$^{-2}$ h$^{-1}$ or less, $1\times10^4$ mg cm$^{-2}$ h$^{-1}$ or less, $9\times10^3$ mg cm$^{-2}$ h$^{-1}$ or less, $8\times10^3$ mg cm$^{-2}$ h$^{-1}$ or less, $7\times10^3$ mg cm$^{-2}$ h$^{-1}$ or less, $6\times10^3$ mg cm$^{-2}$ h$^{-1}$ or less, $5\times10^3$ mg cm$^{-2}$ h$^{-1}$ or less, $4\times10^3$ mg cm$^{-2}$ h$^{-1}$ or less, $3\times10^3$ mg cm$^{-2}$ h$^{-1}$ or less, or $2\times10^3$ mg cm$^{-2}$ h$^{-1}$ or less). The rate that the aluminum is dissolved by the Ga-based liquid alloy can range from any of the minimum values described above to any of the maximum values above. For example, the aluminum can be dissolved at a rate of from $1\times10^3$ mg cm$^{-2}$ h$^{-1}$ to $1\times10^5$ mg cm$^{-2}$ h$^{-1}$ by the Ga-based liquid alloy (e.g., from $1\times10^3$ mg cm$^{-2}$ h$^{-1}$ to $1\times10^4$ mg cm$^{-2}$ h$^{-1}$, from $1\times10^4$ mg cm$^{-2}$ h$^{-1}$ to $1\times10^5$ mg cm$^{-2}$ h$^{-1}$, from $3\times10^3$ mg cm$^{-2}$ h$^{-1}$ to $1\times10^5$ mg cm$^{-2}$ h$^{-1}$, from $5\times10^3$ mg cm$^{-2}$ h$^{-1}$ to $1\times10^5$ mg cm$^{-2}$ h$^{-1}$, from $7\times10^3$ mg cm$^{-2}$ h$^{-1}$ to $1\times10^5$ mg cm$^{-2}$ h$^{-1}$, or from $9\times10^3$ mg cm$^{-2}$ h$^{-1}$ to $1\times10^5$ mg cm$^{-2}$ h$^{-1}$).

In some examples, the Ga-based liquid alloy can comprise a Ga—In alloy. In some examples, the Ga-based liquid alloy can comprise a Ga—In—Sn alloy.

In some examples, the Ga—In—Sn alloy can comprise 60 wt % or more Ga (e.g., 61 wt % or more, 62 wt % or more, 63 wt % or more, 64 wt % or more, 65 wt % or more, 66 wt % or more, 67 wt % or more, 68 wt % or more, 69 wt % or more, 70 wt % or more, 71 wt % or more, 72 wt % or more, 73 wt % or more, 74 wt % or more, 75 wt % or more, 76 wt % or more). In some examples, the Ga—In—Sn alloy can comprise 77 wt % or less Ga (e.g., 76 wt % or less, 75 wt % or less, 74 wt % or less, 73 wt % or less, 72 wt % or less, 71 wt % or less, 70 wt % or less, 69 wt % or less, 68 wt % or less, 67 wt % or less, 66 wt % or less, 65 wt % or less, 64 wt % or less, 63 wt % or less, 62 wt % or less, or 61 wt % or less). The amount of Ga in the Ga—In—Sn alloy can range from any of the minimum values described above to any of the maximum values described above. For example, the Ga—In—Sn alloy can comprise from 60 wt % to 77 wt % Ga (e.g., from 60 wt % to 69 wt %, from 69 wt % to 77 wt %, from 60 wt % to 65 wt %, from 65 wt % to 70 wt %, from 70 wt % to 77 wt %, from 66 wt % to 67 wt %, or from 76 wt % to 77 wt %).

In some examples, the Ga—In—Sn alloy can comprise 10 wt % or more In (e.g., 11 wt % or more, 12 wt % or more, 13 wt % or more, 14 wt % or more, 15 wt % or more, 16 wt % or more, 17 wt % or more, 18 wt % or more, 19 wt % or more, or 20 wt % or more). In some examples, the Ga—In—Sn alloy can comprise 21 wt % or less In (e.g., 20 wt % or less, 19 wt % or less, 18 wt % or less, 17 wt % or less, 16 wt % or less, 15 wt % or less, 14 wt % or less, 13 wt % or less, 12 wt % or less, or 11 wt % or less). The amount of In in the Ga—In—Sn alloy can range from any of the minimum values described above to any of the maximum values described above. For example, the Ga—In—Sn alloy can comprise from 10 wt % to 21 wt % In (e.g., from 10 wt % to 15 wt %, from 15 wt % to 21 wt %, from 10 wt % to 13 wt %, from 13 wt % to 16 wt %, from 16 wt % to 19 wt %, from 19 wt % to 21 wt %, from 20 wt % to 21 wt %, or from 14 wt % to 15 wt %).

In some examples, the Ga—In—Sn alloy can comprise 5 wt % or more Sn (e.g., 6 wt % or more, 7 wt % or more, 8 wt % or more, 9 wt % or more, 10 wt % or more, 11 wt % or more, or 12 wt % or more). In some examples, the Ga—In—Sn alloy can comprise 13 wt % Sn or less (e.g., 12 wt % or less, 11 wt % or less, 10 wt % or less, 9 wt % or less, 8 wt % or less, 7 wt % or less, or 6 wt % or less). The amount of Sn in the Ga—In—Sn alloy can range from any of the minimum values described above to any of the maximum values described above. For example, the Ga—In—Sn alloy can comprise from 5 wt % to 13 wt % Sn (e.g., from 5 wt % to 8 wt %, from 8 wt % to 13 wt %, from 5 wt % to 7 wt %, from 7 wt % to 9 wt %, from 9 wt % to 11 wt %, from 11 wt % to 13 wt %, from 12 wt % to 14 wt %, or from 8 wt % to 10 wt %).

For example, the Ga-based liquid alloy can comprise from 60 wt % to 77 wt % Ga, from 10 wt % to 21 wt % In, and 5 wt % to 13 wt % Sn. In some examples, the Ga-based liquid alloy can comprise 66-67 wt % Ga, 20-21 wt % In, and 12-14% Sn. In some examples, the Ga-based liquid alloy can comprise 76-77 wt % Ga, 14-15 wt % In, and 8-10 wt % Sn.

Contacting the solid with the Ga-based liquid alloy can, for example, comprise coating the solid with a thin layer of the Ga-based liquid alloy. For example, the thin layer of the Ga-based liquid alloy can have a thickness on the order of a few millimeters or less. For example, the Ga-based liquid alloy can be coated onto the solid by spin coating, drop-casting, zone casting, dip coating, blade coating, spraying, slot die coating, curtain coating, or combinations thereof.

The aluminum-alloy mixture can, for example, comprise 2 wt % or more aluminum (e.g., 3 wt % or more, 4 wt % or more, 5 wt % or more, 10 wt % or more, 15 wt % or more, 20 wt % or more, 25 wt % or more, 30 wt % or more, 35 wt % or more, 40 wt % or more, 45 wt % or more, 50 wt % or more, or 55 wt % or more). In some examples, the aluminum-alloy mixture can comprise 60 wt % or less aluminum (e.g., 55 wt % or less, 50 wt % or less, 45 wt % or less, 40 wt % or less, 35 wt % or less, 30 wt % or less, 25 wt % or less, 20 wt % or less, 15 wt % or less, 10 wt % or less, or 5 wt % or less). The amount of aluminum in the aluminum-alloy mixture can range from any of the minimum values described above to any of the maximum values described above. For example, the aluminum alloy-mixture can comprise from 2 wt % to 60 wt % aluminum (e.g., from 2 wt % to 30 wt %, from 30 wt % to 60 wt %, from 5 wt % to 55 wt %, from 10 wt % to 50 wt %, from 15 wt % to 45 wt %, or from 20 wt % to 40 wt %).

The methods further comprise contacting the aluminum-alloy mixture with a fluid comprising water, thereby forming the aluminum oxide aerogel. As used herein, a "fluid" includes a liquid, a gas, a supercritical fluid, or a combination thereof. The fluid can further comprise, in some example, a carrier gas, such as nitrogen, argon, or a combination thereof.

In some examples, the fluid further comprises $CO_2$ and the method further comprises producing a syngas comprising CO and $H_2$ by contacting the aluminum-alloy mixture with the fluid. Also disclosed herein are methods of making an aluminum oxide aerogel and syngas, the method comprising: contacting a solid comprising aluminum with a Ga-based liquid alloy to dissolve at least a portion of the aluminum from the solid, thereby forming an aluminum-alloy mixture; and contacting the aluminum-alloy mixture with a fluid comprising water and carbon dioxide, thereby forming the aluminum oxide aerogel and producing a syngas comprising CO and $H_2$. The CO and $H_2$ can, for example, be produced at a molar ratio of $H_2$:CO of 3:1 or less (e.g., 2.75:1 or less, 2.5:1 or less, 2.25:1 or less, 2:1 or less, 1.75:1 or less, 1.5:1 or less, or 1.25:1 or less). In some examples, the CO and $H_2$ can be produced at a molar ratio of 1:1 or more (e.g., 1.25:1 or more, 1.5:1 or more, 1.75:1 or more, 2:1 or more, 2.25:1 or more, 2.5:1 or more, or 2.75:1 or more). The molar ratio of $H_2$:CO can range from any of the minimum values described above to any of the maximum values described above. For example, the CO and $H_2$ can be produced at a molar ratio of from 3:1 to 1:1 (e.g., from 2.75:1 to 1.25:1, from 2.5:1 to 1.5:1, or from 2.25:1 to 1.25 to 1). In some example, the CO and $H_2$ can be produced at a molar ratio of 2:1.

The $CO_2$ can, for example, be provided by a waste gas stream, such as a flue gas or waste gas stream from ethanol plants, food and beverage operations, coal and gas power plants, and other industrial processes. As such, in some example, the methods described herein can comprise methods of capturing and converting $CO_2$ to a syngas comprising CO and $H_2$.

In some examples, the aluminum-alloy mixture can be contacted with the fluid at a temperature of 25° C. or more (e.g., 26° C. or more, 27° C. or more, 28° C. or more, 29° C. or more, 30° C. or more, 35° C. or more, 40° C. or more, 45° C. or more, 50° C. or more, 60° C. or more, 70° C. or more, 80° C. or more, 90° C. or more, 100° C. or more, 125° C. or more, 150° C. or more, 175° C. or more, 200° C. or more, or 225° C. or more). In some examples, the aluminum-alloy mixture can be contacted with the fluid at a temperature of 250° C. or less (e.g., 225° C. or less, 200° C. or less, 175° C. or less, 150° C. or less, 125° C. or less, 100° C. or less, 90° C. or less, 80° C. or less, 70° C. or less, 60° C. or less, 50° C. or less, 45° C. or less, 40° C. or less, 35° C. or less, or 30° C. or less). The temperature at which the fluid is contacted with the aluminum-alloy mixture can range from any of the minimum values described above to any of the maximum values described above. For example, the aluminum-alloy mixture can be contacted with the fluid at a temperature of from 25° C. to 250° C. (e.g., from 25° C. to 150° C., from 150° C. to 250° C., from 25° C. to 200° C., from 25° C. to 100° C., from 25° C. to 80° C., from 25° C. to 50° C., from 25° C. to 45° C., from 25° C. to 40° C., from 25° C. to 35° C., or from 25° C. to 30° C.).

In some examples, the aluminum-alloy mixture is contacted with the fluid at a pressure of 1 atmosphere (atm) or more (e.g., 2 atm or more, 3 atm or more, 4 atm or more, 5 atm or more, 10 atm or more, 15 atm or more, 20 atm or more, 30 atm or more, 40 atm or more, 50 atm or more, 75 atm or more, 100 atm or more, 125 atm or more, 150 atm or more, or 175 atm or more). In some examples, the aluminum-alloy mixture is contacted with the fluid at a pressure of 200 atm or less (e.g., 175 atm or less, 150 atm or less, 125 atm or less, 100 atm or less, 75 atm or less, 50 atm or less, 40 atm or less, 30 atm or less, 20 atm or less, 15 atm or less, 10 atm or less, or 5 atm or less). The pressure at which the aluminum-alloy mixture is contacted with the fluid can range from any of the minimum values described above to any of the maximum values described above. For example, the aluminum-alloy mixture can be contacted with the fluid at a pressure of from 1 atm to 200 atmospheres (e.g., from 1 atm to 150 atm, from 100 atm to 100 atm, from 1 atm to 50 atm, from 1 atm to 40 atm, from 1 atm to 30 atm, from 1 atm to 20 atm, or from 1 to 10 atm).

Also disclosed herein are the aluminum oxide aerogels made by the methods herein. The aluminum oxide aerogel can, for example, have a porosity of 90% or more as measured by BET (e.g., 91% or more, 92% or more, 93% or more, 94% or more, 95% or more, 96% or more, 97% or more, 98% or more, or 99% or more). In some examples, the aluminum oxide aerogel can have a density of 20 mg/cm$^3$ or less (e.g., 19 mg/cm$^3$ or less, 18 mg/cm$^3$ or less, 17 mg/cm$^3$ or less, 16 mg/cm$^3$ or less or 15 mg/cm$^3$ or less).

In some examples, the aluminum oxide aerogel has a specific surface area of 100 m$^2$/g or more as measured by BET (e.g., 105 m$^2$/g or more, 110 m$^2$/g or more, 115 m$^2$/g or more, 120 m$^2$/g or more, 125 m$^2$/g or more, 130 m$^2$/g or more, 135 m$^2$/g or more, 140 m$^2$/g or more, 145 m$^2$/g or more, 150 m$^2$/g or more, 155 m$^2$/g or more, 160 m$^2$/g or more, 170 m$^2$/g or more, 180 m$^2$/g or more, or 190 m$^2$/g or more). In some examples, the aluminum oxide aerogel has a specific surface area of 200 m$^2$/g or less as measured by BET (e.g., 190 m$^2$/g or less, 180 m$^2$/g or less, 170 m$^2$/g or less, 160 m$^2$/g or less, 155 m$^2$/g or less, 150 m$^2$/g or less, 145 m$^2$/g or less, 140 m$^2$/g or less, 135 m$^2$/g or less, 130 m$^2$/g or less, 125 m$^2$/g or less, or 120 m$^2$/g or less). The specific surface area of the aluminum oxide aerogel can range from any of the minimum values described above to any of the maximum values described above. For example, the aluminum oxide aerogel can have a specific surface area of from 100 m$^2$/g to 200 m$^2$/g as measured by BET (e.g., from 100 m$^2$/g to 180 m$^2$/g, from 110 m$^2$/g to 170 m$^2$/g, from 120 m$^2$/g to 160 m$^2$/g, or from 130 m$^2$/g to 150 m$^2$/g).

The aluminum oxide aerogel can, in some examples, comprise a plurality of fibers having an average diameter of 10 nanometers (nm) or more (e.g., 15 nm or more, 20 nm or more, 25 nm or more, 30 nm or more, 40 nm or more, 50 nm or more, 60 nm or more, 70 nm or more, 80 nm or more, 90 nm or more, 100 nm or more, 150 nm or more, 200 nm or more, 250 nm or more, 300 nm or more, 350 nm or more, 400 nm or more, or 450 nm or more). In some examples, the aluminum oxide aerogel can comprise a plurality of fibers having an average diameter of 500 nm or less (e.g., 450 nm or less, 400 nm or less, 350 nm or less, 300 nm or less, 250 nm or less, 200 nm or less, 150 nm or less, 100 nm or less, 90 nm or less, 80 nm or less, 70 nm or less, 60 nm or less, 50 nm or less, 40 nm or less, 30 nm or less, 25 nm or less, or 20 nm or less). The average diameter of the plurality of fibers comprising the aluminum oxide aerogel can range from any of the minimum values described above to any of the maximum values described above. For example, the aluminum oxide aerogel can comprise a plurality of fibers having an average diameter of from 10 nm to 500 nm (e.g., from 10 nm to 250 nm, from 250 nm to 500 nm, from 10 nm to 400 nm, from 10 nm to 300 nm, from 10 nm to 200 nm, or from 10 nm to 100 nm).

In some examples, the aluminum oxide aerogel can comprise a monolith 1 millimeter or more in size (e.g., 10 mm or more, 20 mm or more, 30 mm or more, 40 mm or more, 50 mm or more, 100 mm or more, 150 mm or more, 200 mm or more, 250 mm or more, 300 mm or more, 400 mm or more, 500 mm or more, 600 mm or more, 700 mm or more, 800 mm or more, 900 mm or more, 1 cm or more, 2 cm or more, 3 cm or more, 4 cm or more, or 5 cm or more).

The aluminum oxide aerogel can, for example, comprise any aerogel comprising aluminum, such as amorphous or crystalline aluminum oxide, aluminum oxyhydroxide, aluminum nitride, or aluminum oxycarbide. In some examines, the aluminum oxide aerogel can comprise an alumina aerogel, which can, for example, comprise $Al_2O_3$ (e.g., amorphous or crystalline $Al_2O_3$). In some examples, the aluminum oxide aerogel comprises 2% or less of water by weight (e.g., 1.75% by weight or less, 1.5% by weight or less, 1.25% by weight or less, 1% by weight or less, 0.75% by weight or less, 0.5% by weight or less, or 0.1% by weight or less).

In some examples, the aluminum oxide aerogel comprises 98% or more of aluminum oxide by weight (e.g., 98.25% by weight or more, 98.5% by weight or more, 98.75% by weight or more, 99% by weight or more, 99.25% by weight or more, 99.5% by weight or more, or 99.75% by weight or more). In some examples, the aluminum oxide aerogel consists of aluminum oxide.

In some examples, the aluminum oxide aerogel comprises 98% or more of $Al_2O_3$ by weight (e.g., 98.25% by weight or more, 98.5% by weight or more, 98.75% by weight or more, 99% by weight or more, 99.25% by weight or more, 99.5% by weight or more, or 99.75% by weight or more). In some examples, the aluminum oxide aerogel consists of $Al_2O_3$.

The methods can, in some examples, further comprise annealing the aluminum oxide aerogel at a temperature of from 800° C. or more (e.g., 825° C. or more, 850° C. or more, 875° C. or more, 900° C. or more, 925° C. or more, 950° C. or more, 975° C. or more, 1000° C. or more, 1025° C. or more, 1050° C. or more, or 1075° C. or more). In some examples, the aluminum oxide aerogel can be annealed at a temperature of 1100° C. or less (e.g., 1075° C. or less, 1050° C. or less, 1025° C. or less, 1000° C. or less, 975° C. or less, 950° C. or less, 925° C. or less, 900° C. or less, 875° C. or less, 850° C. or less, or 825° C. or less). The temperature at which the aluminum oxide aerogel is can range from any of the minimum values described above to any of the maximum values described above. For example, the methods can further comprise annealing the aluminum oxide aerogel at a temperature of from 800° C. to 1100° C. (e.g., from 800° C. to 950° C., from 950° C. to 1100° C., from 800° C. to 900° C., from 900° C. to 1000° C., from 1000° C. to 1100° C., or from 850° C. to 1050° C.). The annealed aluminum oxide aerogel can, for example, comprise crystalline aluminum oxide. In some examples, the annealed aluminum oxide aerogel can comprise crystalline $Al_2O_3$.

In some examples, the methods can further comprise separating the Ga-based liquid alloy from the aluminum oxide aerogel, thereby forming a recycled Ga-based liquid alloy. The Ga-based liquid alloy can be separated from the aluminum oxide aerogel, for example, by filtration and/or centrifugation. In some examples, the recycled Ga-based liquid alloy is used to contact the solid.

Also disclosed herein are methods of use of the aluminum oxide aerogels described herein. For example, the aluminum oxide aerogels can be used as insulators, catalyst supports, or a combination thereof.

A number of embodiments of the invention have been described. Nevertheless, it will be understood that various modifications may be made without departing from the spirit and scope of the invention. Accordingly, other embodiments are within the scope of the following claims.

The examples below are intended to further illustrate certain aspects of the systems and methods described herein, and are not intended to limit the scope of the claims.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of measurement conditions, e.g., component concentrations, temperatures, pressures and other measurement ranges and conditions that can be used to optimize the described process.

Example 1

Described herein is a technological solution for capturing and converting concentrated waste streams of $CO_2$ to synthesis gas, i.e., syngas ($H_2$ and CO in a 2:1 molar ratio), within a reactor design that achieves the simultaneous conversion of aluminum metal into a valuable aerogel material based on aluminum oxide. The process can yield high-purity syngas in an optimal 2:1 molar ratio of $CO:H_2$ for suitability for conversion to biofuels, produced together with a high-value aluminum oxide aerogel material that currently finds use as a super-insulator and a high-temperature catalyst support. The reaction conditions can take place at relatively low temperatures (room temperature to <250° C.) and atmospheric pressure without the need for separate, multi-step, expensive $CO_2$ absorption and conversion steps.

The process can be both modular and can be profitable on a small-scale, i.e., compatible with distributed point sources of $CO_2$ waste streams. Further, the methods described herein can utilize inexpensive and non-recyclable aluminum-alloy waste sources in order to accomplish the simultaneous capture and conversion of $CO_2$ from waste streams, thus leveraging two large, under-utilized waste streams resulting in the production of both biofuel precursors/products and high-value aerogel materials. The relatively small capital costs involved in setting up this reaction process, coupled to the concurrent production of aluminum oxide aerogel materials from inexpensive aluminum sources, can yield a high margin of profitability at the relatively smaller scales involved. Thus, a simple, inexpensive, and modular reaction system that eliminates the significant energy needs and penalties for the capture, storage and/or transport of $CO_2$ is discussed herein. The reaction design and conditions for syngas production within a single reactor system, together with the production and properties of the aluminum oxide aerogels, will be investigated. The focus will be on inexpensive reactor conditions and designs that can directly utilize $CO_2$ waste streams and in order to react them with aluminum alloys.

A schematic diagram of the $CO_2$-conversion technology that can enable the creation of a diverse biofuels platform is illustrated in FIG. 1. The process allows both the capture and conversion of $CO_2$ from a gaseous waste stream within a single reactor and without the need of separate chemical steps that are less efficient and subsequently more expensive (e.g., as known for other processes such as amine absorption followed by reverse water-gas shift catalysis at ~600-1,000° C.). The targeted feedstocks that are relevant for these conversion efforts include waste streams arising from highly-concentrated $CO_2$ sources, such as ethanol plants, food and beverage operations, power plants, and other industrial processes. This underlying chemical conversion process can be investigated using various inexpensive low-purity aluminum alloys that cannot easily be recycled owing to the diversity and high concentrations of the alloying elements. The selective reaction/dissolution of aluminum is possible within a low-temperature Ga-based liquid alloy, and which provides the high-energy intermediate that is used to drive the chemical reduction of $CO_2$ to syngas at relatively low temperatures (from ~250° C. down to room temperature). Further, this process produces an ultrahigh-purity aluminum oxide aerogel material that is a value-added product and is useful as a super insulating material and as a high-temperature catalyst support. Furthermore, the aluminum oxide aerogel, after use as an insulator and/or catalyst if desired, is in a form that can be recycled to aluminum metal via the industrial Hall-Héroult process or by solar-driven thermochemical or electrochemical processes. Thus, the methods described herein harness inexpensive and non-recyclable aluminum sources for driving the conversion of biogenic $CO_2$ to syngas, and thus achieving significantly lower capital costs for enabling syngas use with downstream conversions to liquid fuels.

Biogenic sources of $CO_2$, such as produced in ethanol plants or from the pulp and paper industries, currently represent undervalued feedstocks (at ~$14-$39 per metric ton) that would be highly attractive to use in the commercial synthesis of bio-derived fuels. An economically viable and commercialized process for producing biofuels from $CO_2$ would have the added advantages of reducing greenhouse emissions as well as increasing the contributions from domestic sources of energy within the U.S. However, the utilization of large-scale chemical processes for the conversion of $CO_2$ to fuels is typically prohibitive because of the added expenses involved in carbon capture, as well as from the major infrastructure costs required to store and transport it to centralized chemical plants. The methods described herein represent a new technological biofuels platform that can provide compatibility with existing infrastructure, reductions in greenhouse gas emissions, and a reduction in U.S. dependence on foreign oil. For example, this could assist coal and natural gas power plants to satisfy their reduction targets for greenhouse gas emissions. The production of bio-derived fuels from $CO_2$ and non-recyclable aluminum alloys would also serve to decrease the environmental impacts resulting from two different types of significant waste streams. The recycling of the high-purity aluminum oxide product to aluminum metal would ultimately provide for a closed-loop and renewable energy recycle. The use of syngas as a precursor for biofuels production would also help to displace virgin petroleum for alternate uses, and thereby lowering the market costs of non-renewable carbon sources. Specific groups in the commercial sector that would benefit include $CO_2$ emitters, e.g., power plants, ethanol plants, etc. Another benefit is the ability to utilize abundant aluminum in obsolete aircraft to cultivate a thriving bio-based economy that can enable a sustainable nationwide production of biofuels. The resultant process would also serve to produce aluminum oxide aerogels that already represent a highly-marketable product used in the space, aeronautical, and oil and gas industries. Thus, this product can be used to leverage a lower ultimate cost for the co-produced biofuels in the process.

According to a technoeconomic analysis, the high capital costs for a syngas-to-liquid fuel plant represents one of the greatest economic barriers for a biofuels platform to achieve economic viability. Therein, it has been estimated that at least 50% (and likely up to 75%) of the costs of the fuels produced from the syngas, i.e., methanol, olefins, etc., are pre-determined by the cost of the initial syngas production process. Thus, the economic viability of a biofuels platform rests with the ability of a process to produce syngas that can be simple and operational with relatively low capital costs.

The capital costs for gas-to-liquids (GTL) facilities has been reported to be over ~$100,000 bpd (barrels per day), with total project costs coming to US $19 Billion for $140,000 bpd GTL based on refining capital costs. This represents a tremendous current market potential for gas-to-liquid fuels producers that could utilize the technology described herein, with the process described herein aimed directly at addressing the major barrier of capital costs. Further, this technology can enable GTL producers (on a smaller scale) to access a lower-cost production process that is commercially viable over distributed sites (i.e., less centralized) for use with under-valued $CO_2$ waste streams. In addition, the market for the co-produced aerogel materials is estimated to reach 2 Billion within 5 years, driven by uses in the automotive, building, oil and gas, and aerospace sectors. Importantly, a major user of aerogel materials are industrial GTL plants, which use them as high temperature catalyst supports for many different catalyst processes. Thus, the co-production of a high value aerogel material would have both an external marketability, as well as can potentially fill internal technological needs of the catalytic processes within the GTL plants.

Alternate, competing, chemical approaches in the recent literature include the production of $H_2$ by electrochemical, photochemical or thermochemical pathways, followed by a reaction with $CO_2$ using the reverse water-gas shift reaction (RWGS, i.e., $H_2(g)+CO_2 \rightarrow CO(g)+H_2O(g)$; $\Delta H_{298K°}=+41.2$ kJ/mol). For example, two main approaches for the production of molecular hydrogen is via the electrolysis of water or a thermally-driven redox cycle, each of which requires a significant energy input and suffers from energy inefficiencies. Capital costs of setting up these systems in a highly-distributed manner across thousands of different point sources of $CO_2$, or alternatively, centralizing the $H_2$ production and transporting it to the numerous $CO_2$ point sources, are prohibitive both economically and technically. Further, the RWGS reaction is endothermic and typically takes place only at high temperatures (~≥600° C.), for example, with the use of aluminum oxide or silica supported copper-based materials (e.g., Cu/γ-$Al_2O_3$ or Cu/$SiO_2$) or supported ceria materials (e.g., Ni/$CeO_2$). These aluminum oxide or silica supported copper-based materials suffer from catalyst aggregation and surface deactivation over time. Finally, this overall process requires the combination of the three separate steps involving carbon capture, hydrogen production, followed by the RWGS reaction. A sequential, multi-step process such as this requires large overall capital costs, as well as suffers from a multiplication of the inefficiencies (and side-products) of each of the individual steps. These disadvantages lead to large-scale industrial processes being the only economically viable approach. However, a modular, inexpensive and scalable reaction process is needed that is compatible with the highly-distributed point sources of $CO_2$ waste streams.

By contrast, the proposed $CO_2$ conversion process discussed herein represents a low-capital cost conversion system for the production of syngas. This approach requires only an inexpensive aluminum source (i.e., especially, non-recyclable aluminum from obsolete aircraft components), coating by the Ga-based liquid alloy, and a concentrated $CO_2$ waste stream. The $H_2$ and CO mixture is generated in-situ during the oxidation of the aluminum metal to the aluminum-oxide aerogel material, and can occur at normal atmospheric pressures and from room temperature up to a few hundred degrees. Thus, three separate steps are combined into a single reactor design that can represent a low cost system that generates an inexpensive source of syngas. Reactor designs and post-reaction processing techniques can allow for the efficient separation, recovery, and purification of both the aluminum oxide aerogel material and the Ga-based liquid alloy, such as by centrifugation and/or re-crystallization methods at low temperatures. For example, the Ga-based liquid alloy can be collected by centrifugation and purified by re-crystallization at slightly lower than room temperature, and can thus be re-used during the next cycle. This system can be coupled to downstream syngas-to-liquid-fuels processes, and thus can lower the associated costs to enable the production of a range of possible biofuels. A lower cost for the biofuels can also be leveraged by the high-commercial value of the simultaneously produced aluminum oxide aerogel materials.

For the reduction process of $CO_2$ to syngas, the activation step is initiated first by contact and/or dissolution of aluminum into a Ga-based alloy (i.e., in the Ga—In—Sn ternary system, as described below). The direct oxidation of aluminum can be inhibited by the formation of a surface-passivating oxide layer. However, specific base metals, such as liquid mercury or gallium, can break the passivating oxide layer and lower the activation barrier to oxidation of aluminum.

Figure 2:
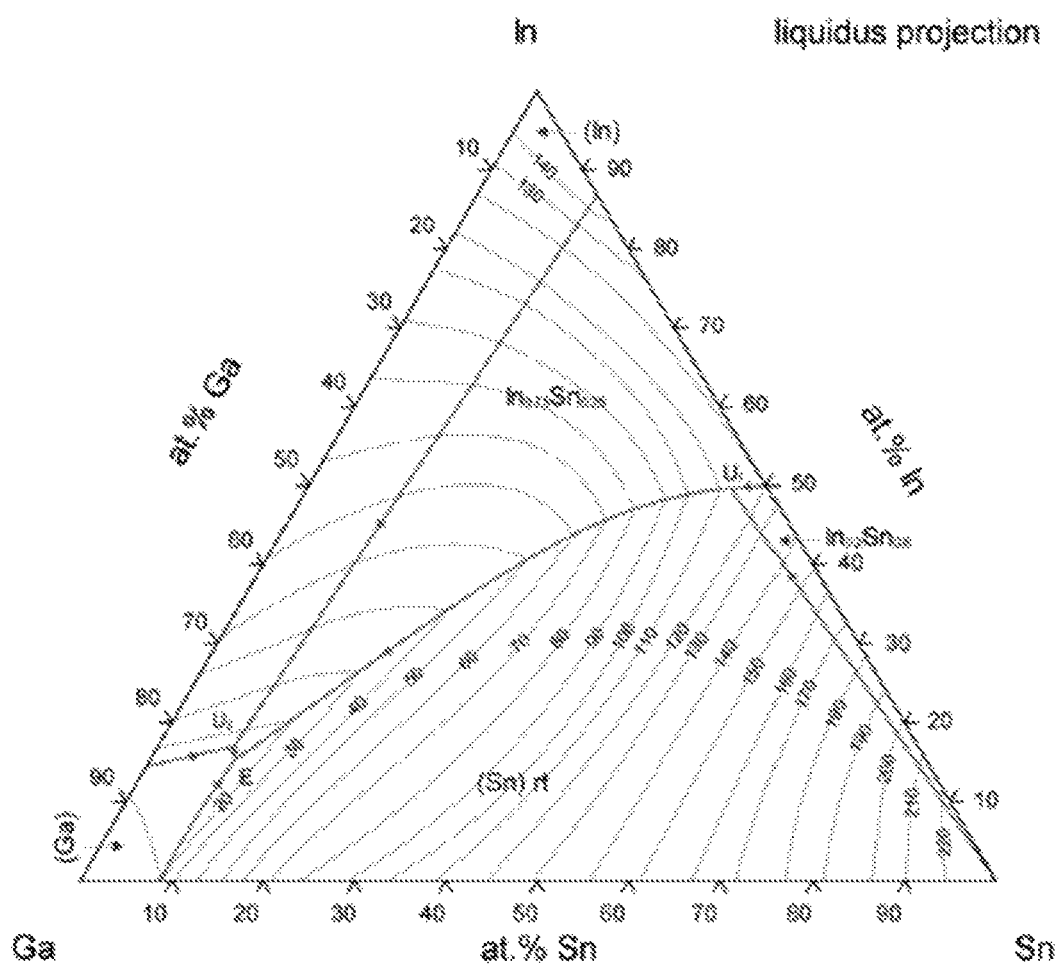
FIG. 2 is the liquidus project of the ternary Ga—In—Sn phase diagram.

When aluminum metal is dissolved into the liquid metal, it can become 'activated' towards oxidation, resulting in the reduction of $H_2O$ and/or $CO_2$ (i.e., to $H_2$ and CO, respectively) and the growth from its surface of an aluminum oxide aerogel with high surface areas. By coating a small amount of the Ga-based alloy onto the aluminum metal, a large amount of aluminum can be activated by a thin coating. The ternary phase diagram of Ga—In—Sn, shown in FIG. 2, exhibits a wide range of possible compositions with melting points within the ternary alloy system spanning from ~11° C. (Ga-rich) to ~232° C. (Sn-rich). The lowest melting point composition is closest to that for pure gallium, mixed with 14.4% In and 8.8% Sn, and can make the reaction of aluminum possible at down to room temperature. This lowest melting composition can be utilized in order to coat and continuously dissolve different sources of aluminum, and followed by reduction reactions with $CO_2$ at temperatures that can be tested from 25° C. up to 250° C., as described below.

Prior studies have shown that gallium-concentrated alloys can easily dissolve other metals as well, including many alkali metals and transition metals (e.g., Mg, Zn, Cu) that are common contaminants in aluminum alloys. The rates of aluminum dissolution (~$10^4$ mg cm$^{-2}$ h$^{-1}$) into gallium are among the highest by a few orders of magnitude, thereby facilitating its selective extraction from within aluminum-based alloys. However, many of the alloying metals are also highly-desired dopants to be incorporated within aluminum oxide aerogel materials, e.g., Mg- or Cu-doped aluminum oxide for use in catalysis or gaseous absorption. Thus, the impurity metals within different sources of aluminum alloys can potentially be used advantageously to prepare different types of doped-aerogel materials.

Different grades of aluminum alloys, i.e., containing up to ~15% of alloying metals, can be tested by coating with a thin layer of the Ga-based alloy and placing it within a reaction chamber that is lined with Teflon. This reaction chamber can be heated from room temperature up to 250° C., and the dissolution of aluminum metal from the alloy can be investigated at periodic intervals of up to 2-3 days.

The continuous dissolution of the aluminum metal generates a liquid alloy that contains highly-reactive aluminum metal at its surfaces, and which can lead to the reduction of $CO_2$ and $H_2O$ to syngas, i.e., CO and $H_2$. Chemical thermodynamics shows that this reaction (R1; below) is highly unfavored to occur at room temperature, with a relatively small entropy term and temperature dependence. However, the use of aluminum oxide as a powerful reductant (and elimination of $O_2(g)$ as a product in R1), yields an energetically-favorable reaction (R2; below) that can proceed at room temperature with the aluminum that is rendered extremely reactive within the Ga-based liquid alloy.

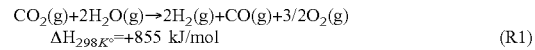

$$CO_2(g)+2H_2O(g) \rightarrow 2H_2(g)+CO(g)+3/2O_2(g)$$
$$\Delta H_{298K°}=+855 \text{ kJ/mol} \quad \quad (R1)$$

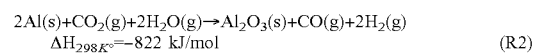

$$2Al(s)+CO_2(g)+2H_2O(g) \rightarrow Al_2O_3(s)+CO(g)+2H_2(g)$$
$$\Delta H_{298K°}=-822 \text{ kJ/mol} \quad \quad (R2)$$

Reaction R2 can occur near room temperature. The reaction of $CO_2$ alone proceeds at relatively slower rates, yielding CO, $Al_2O_3$, and a minor amount of unidentified aluminum oxycarbides. A ratio of 2:1 for $H_2O:CO_2$ is predicted by the balanced chemical reaction to yield an ideal syngas mix of 2:1 for $H_2:O_2$ at thermodynamic equilibrium. However, as the reduction reactions involving $CO_2$ and $H_2O$ proceed at respectively slower and faster rates, different amounts of mixing of the $CO_2$ and $H_2O$ can be investigated in order to obtain the ideal mixture of the syngas products. A produced syngas mixture of 2:1 for $H_2:O_2$ will not require further purification or mixing to be useful in subsequent downstream catalytic reactions for producing biofuels, as given in reaction R3 (wherein —$CH_2$— is part of a hydrocarbon chain).

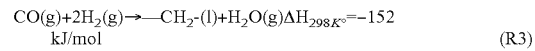

$$CO(g)+2H_2(g) \rightarrow -CH_2-(l)+H_2O(g) \Delta H_{298K°}=-152 \text{ kJ/mol} \quad (R3)$$

Figure 3:
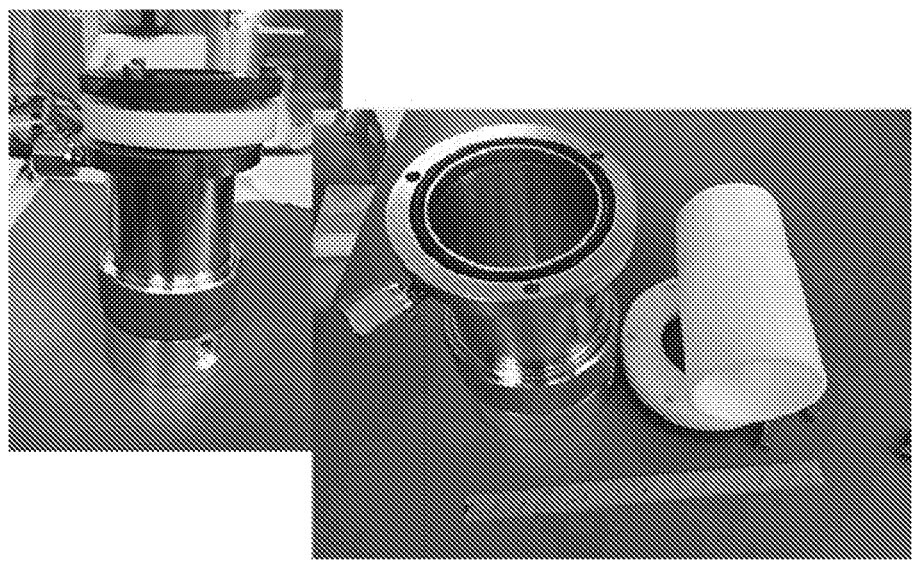
FIG. 3 is a picture of the reaction cell for the reduction of $CO_2(g)$ and $H_2O(g)$ gas mixtures to syngas with the simultaneous growth of aluminum oxide aerogels.

The reactor setup, shown in FIG. 3, allows control over a flowing gas mixture of $CO_2$ and $H_2O$ and can accommodate temperatures of up to ~250° C. (within a convection oven) and pressures up to ~200 atmospheres. For certain examples, the chemical process can be optimized to take place at the lowest possible pressures and temperatures. The surfaces of the aluminum, or aluminum-containing alloy, can be thinly-coated with a layer of the Ga-based liquid alloy before being placed into the chamber and sealed within the chamber. As the reaction proceeds, the aluminum is continuously dissolved into the liquid alloy and diffusing to its upper surfaces react with the $CO_2$ and $H_2O$ gas mixture. This technique provides the capability of reacting significant amounts of aluminum and $CO_2$ with only a small quantity of the Ga-based liquid alloy, and which can be recycled afterwards by centrifugation. There is an outlet port for characterization of the evolved gases by gas chromatography and spectroscopy (e.g., infrared and/or UV-Vis).

Using these experimental techniques, the gas mixture and temperature can be controlled in order to adjust the product distribution of $H_2$ and CO, and for achieving the most complete conversion of $CO_2$ from the initial waste stream. An example sample chamber can hold the growth of relatively large aluminum oxide aerogel monoliths of up to ~2.5 inches in diameter and ~6 inches in height.

These reactions can be investigated using both pure aluminum, as well as with different grades of aluminum alloys, in order to gauge the impact the impurities in the aluminum alloys have on the overall process, thereby gauging the usefulness of various inexpensive sources of aluminum metal. The dissolution of metal impurities into the Ga-based alloy can be minimized owing to the much faster dissolution of the aluminum. However, many of the common metal impurities in aluminum alloys, such as Ti and Mg, are thermodynamically capable of driving these reduction reactions.

The global production of aluminum currently exceeds 60 million metric tons, and ranks aluminum as the second most widely used and produced metal. Further, industrial projections find that the global market for aluminum is anticipated to grow at double the prior trends, and accelerating from 3.0% to 5.9% annual growth. The global drivers for this trend are many industries that are searching for a lighter-weight and inexpensive alternative for mechanical components that can also yield reductions in costs of operation. For example, the automotive, aerospace, electronics, building, and construction industries each show trends towards utilizing aluminum and aluminum-based alloys. However, it has been estimated that approximately 25% of the aluminum consumed in industry cannot be reused or recycled, yielding an annual waste stream of ~15 million tons.

For example, the recycling of aluminum alloys in the aerospace industry represents a major challenge because of the numerous and diverse alloying metals and chemical compositions that are specific to the requirements of the various structural components. Further, aircraft components are continuously replaced with alloys of new compositions, making old structural components obsolete at a technologically quickening pace with no cost-effective way to re-use or extract the valuable aluminum content.

These aluminum waste streams are expected to grow exponentially, and constitute an abundant and inexpensive resource that could potentially be harnessed to drive the capture and chemical reduction of $CO_2$-containing waste streams to biofuel precursors. For example, the ~15 million tons of "non-recyclable" aluminum described above could be used to convert ~12.2 million metric tons of $CO_2$ to syngas, based on reaction R2 above.

High-purity aluminum sources can be used for initial testing of the optimal conditions for syngas production. These experiments can help to identify a suitable range of reaction conditions to be utilized in the subsequent experiments using the aluminum-based alloys.

Figure 4:
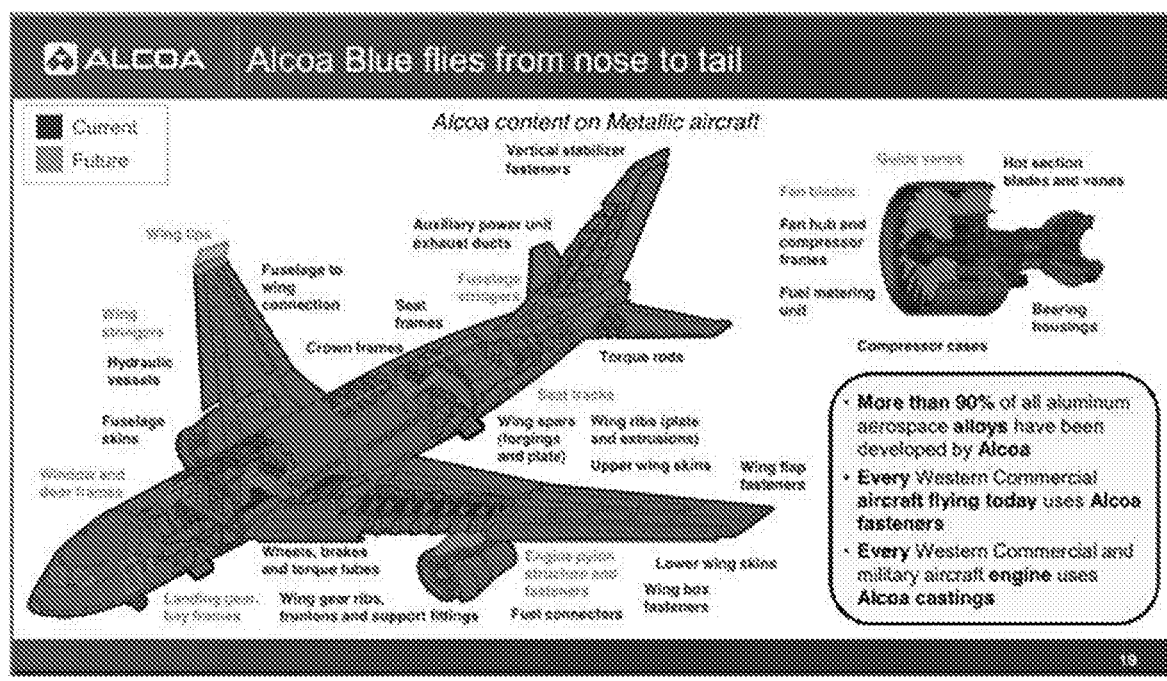
FIG. 4 is a schematic illustration of the aluminum-containing components of an aircraft, as produced by ALCOA.

Grades of aluminum alloys commonly used in the aerospace sectors can serve as key, representative test cases that constitute significant non-recyclable waste stream of aluminum, such as in commonly found components in plane boneyards. Discarded aircraft provide for a large amount of valuable aluminum. For example, aluminum constitutes ~70% of airplane components, e.g., fuel tanks, fuselage, wings, engine block, and many other parts (FIG. 4). However, their cost-effective recycling is prohibitively complex because of the high content, number, and wide variability of the alloying elements present in each of the component parts. Common grades of wrought and cast aluminum alloys used can be tested for the selective dissolution of the aluminum in the Ga-based alloy, and capture and reaction with $CO_2$ in gaseous waste streams (as described above). In the aerospace industry, for example, aluminum alloys 2024 and 7075 are representative of many of the most commonly used in aircraft components. Aluminum alloy 2024 (wrought) is used in wing and fuselage structures. The primary alloying element of aluminum alloy 2024 is copper (~4-5 wt %), with additional common impurities of magnesium (~1-2 wt %), and including less than 1 wt % each of iron, silicon, zinc, titanium, and manganese. Aluminum alloy 7075 (wrought) is used as a high strength alloy. The primary alloying elements of aluminum alloy 7075 are zinc (~5-6% by weight), magnesium (~2-3 wt %), and copper (~1-2 wt %), and additional common impurities including less than 1 wt % each of silicon, iron, manganese, chromium, and titanium. Numerous other alloy compositions (and not restricted to uses in the aerospace industry) contain similar alloying metals such as silicon, iron, copper, manganese, magnesium, chromium, and zinc, and the aluminum typically constitutes from ~85% up to ~98% of the metal content in these alloys. As the additional alloying elements present in aluminum alloy 2024 and 7075 are the most common alloying elements in many other grades of aluminum alloys, the selected test compositions can be relatively broadly applicable to many other types of aluminum waste as well. Other alloys that can be applicable include those commonly used in boat and ship building, off-shore marine construction, building industries, and tubulars used in the oil and gas industry.

As discussed above, the technological advances of the proposed syngas production from concentrated $CO_2$ waste streams and aluminum metal can be separated into two main areas: a) the inexpensive and low-temperature production of syngas in a clean and ideal 2:1 molar ratio of $H_2$:CO, and which is leveraged by the b) production of a high-value aluminum oxide aerogel material that has high commercial potential. The advantages of this approach are highly synergistic, as the syngas and aerogel production share the same chemical process, and because it focuses on leveraging the combined usage of two large and existing waste streams (i.e., $CO_2$ and non-recyclable aluminum).

An aerogel is a material that has a high porosity (>90 to 95%), a high specific surface area (~100 to >800 $m^2/g$), and a low density (<5 to 20 $mg/cm^3$). Commercially-useful properties of aerogels include their low thermal conductivities and uses as high surface area supports to enable high catalytic activity. There are many known applications of aluminum oxide aerogels, some of which take place at high temperatures, such as for thermal insulation in supersonic vehicles that can resist temperatures of up to 1200° C. and higher. Aluminum-based aerogels are among the most heat resistant of all known oxide-based aerogels owing to their morphologies and nanoporous structures.

The preparation of aluminum oxide aerogels has traditionally been performed using a multistep sol-gel route starting from aluminum alkoxides or salts. In this solution-based process, the speciation of various aluminum hydroxides and hydrates, and complex equilibria between them, are sensitive and difficult to synthetically control. A few of the parameters that can impact the final form of the aerogel include the type of salt or alkoxide, pH of the solution, temperature, and the amount of water. The preparation of monolithic and stable aluminum oxide aerogels has been especially challenging owing to these complex chemical steps. Aluminum oxide aerogels prepared via these sol-gel processes can be mechanically unstable towards shrinking and cracking during the drying process, as well as hygroscopic in nature. Simpler, solution-free routes to aluminum oxide aerogels are needed that can potentially more finely control the formation of them as stable monolithic aerogels.

The direct oxidation of aluminum in air is well-known to be inhibited by the formation of a surface-passivating oxide layer. Specific base metals, such as liquid mercury or gallium, are known to be able to break the passivating oxide layer and to lower the activation barrier to its oxidation. Recently, at least three different methods have been investigated involving the flowing of water vapor over a solution of liquid mercury with dissolved aluminum, and producing aerogels of aluminum oxide nanofibers, $Al_2O_3 \cdot n(H_2O)$ with n~1-4 (30-43% water). These are reported to exhibit ~99% porosity, surface areas of ~100-800 m²/g, and low thermal conductivities of ~0.1-0.5 W/m·K. However, the drawbacks are the use of toxic mercury and the high water content of the resulting aluminum oxide aerogels. Meanwhile, the synthetic procedures discussed herein demonstrate the growth of high-purity aluminum oxide aerogels that contain very low or no structural water, and without the use of toxic liquid mercury. The aluminum oxide aerogel products made by the methods discussed herein comprise nanofibrous bundles of interwoven aluminum oxide strands. The methods discussed herein do not require the use of aqueous solvents and can produce a substantially moisture-free monolithic growth of aluminum oxide aerogel in that exhibits superior thermal and mechanical stability, as compared to other known synthetic approaches.

The reaction conditions that optimize the efficient conversion of $CO_2$ and production of the syngas in an optimal $CO:H_2$ ratio (i.e., the temperature and ratio of $CO_2$-to-$H_2O$) can be the processing boundaries of the concurrent growth of the aluminum oxide aerogel. However, tuning the chemical composition of the Ga-based liquid alloy provides a unique opportunity to control the rate of formation of the aerogel, and thus to obtain the large monolithic forms. For example, these efforts can include reactions that utilize compositions away from the eutectic point, thereby raising the melting points of the alloy to the range from ~30° C. up to ~200° C. Alloy compositions that increase its melting point and serve to decrease both the aluminum dissolution rate as well as its diffusion rate can also be used. These will likely need to constitute a compatible match with the rates of reduction of $CO_2$ and $H_2O$ reduction at the surfaces. For example, liquid alloys with higher melting points can be prepared in the Sn-richer and In-richer regions of the phase diagram, and these can be used at elevated temperatures within the reaction chamber in order to grow the aerogel. The optimal temperature of the reaction can be investigated. Use of an alloy that allows for aluminum oxide growth at higher temperatures can significantly impact porosity, morphology, surface area, and crystallinity of the resulting aluminum oxide product. Further, the growth, purity, and surface area of the aluminum oxide aerogel can be characterized in order to determine its optimal applications (e.g., as thermal insulation, as a high temperature catalyst support, etc.) and thus its potential commercial uses.

Example 2

Herein, a method for synthesizing aluminum oxide with high surface areas by direct oxidation of aluminum dissolved in a Ga—In—Sn alloy with water vapor at ambient temperature and pressure is discussed. The relationship between the reaction conditions and the surface areas of the aluminum oxide was investigated by characterization of the compositions, structures and surface areas of the aluminum oxide.

Aluminum foil was UHV grade with 99.99% purity, purchased from All-Foils, Inc. The Ga—In—Sn alloy was prepared with 66.504 wt. % Ga, 20.505 wt. % In, and 12.992 wt. % Sn. Grade 4.0 $CO_2$ (purchased from ARCS Gases) was used as the carrier gas for the $H_2O$ vapor.

In an argon-filled glove box, various amounts of shredded aluminum foil (2 wt. %, 10 wt. %, 20 wt. %, 30 wt. %, 40 wt. %, and 60% wt. %) were each dissolved in the Ga—In—Sn alloy. All the Al-alloy mixtures were silver colored. The 2 wt. % and 10 wt. % Al-alloy mixtures were liquid and more likely to ball up. Meanwhile, the 20 wt. %, 30 wt. %, 40 wt. %, and 60% Al-alloy mixtures had a jelly-like consistency and were easy to spread out.

Figure 5:
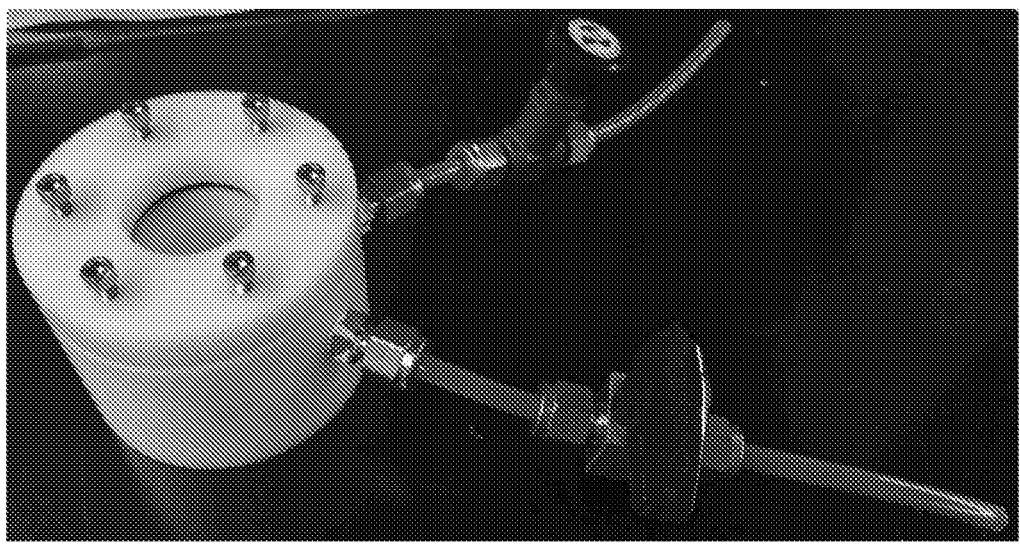
FIG. 5 is a picture of a flow-through chamber used in the synthetic procedure. $H_2O$ vapor flows into and out of the chamber through the two tubes on the side with valves. The glass window on top of the chamber allows observations and photo-documentations during the syntheses. Two O-rings were placed between the top of the chamber and the glass window, as well as between the glass window and the bottom of the chamber, to ensure that the chamber is sealed from the atmosphere.
Figure 6:
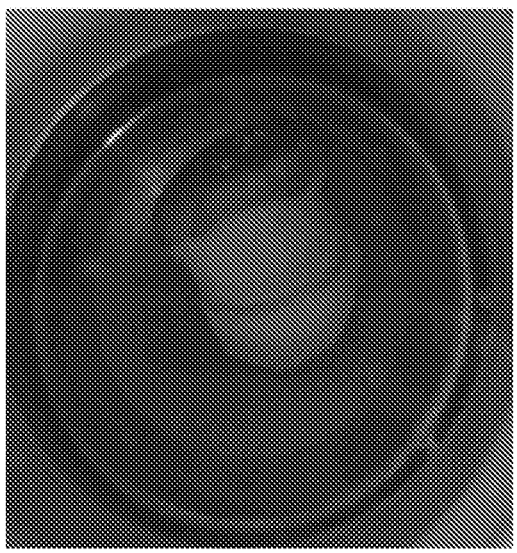
FIG. 6 is an image of the high-surface-area aluminum oxide synthesized from an Al-alloy mixture comprising 2 wt. % of aluminum.
Figure 7:
FIG. 7 is an image of the high-surface-area aluminum oxide synthesized from an Al-alloy mixture comprising 10 wt. % of aluminum.
Figure 8:
FIG. 8 is an image of the high-surface-area aluminum oxide synthesized from an Al-alloy mixture comprising 20 wt. % of aluminum.
Figure 9:
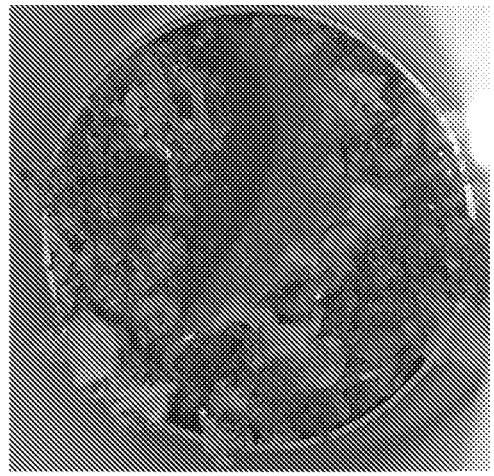
FIG. 9 is an image of the high-surface-area aluminum oxide synthesized from an Al-alloy mixture comprising 30 wt. % of aluminum.
Figure 10:
FIG. 10 is an image of the high-surface-area aluminum oxide synthesized from an Al-alloy mixture comprising 40 wt. % of aluminum.
Figure 11:
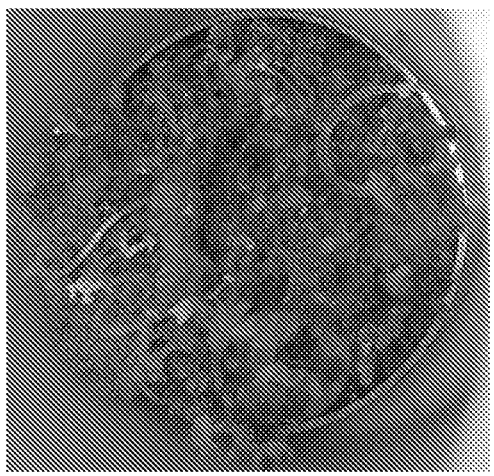
FIG. 11 is an image of the high-surface-area aluminum oxide synthesized from an Al-alloy mixture comprising 60 wt. % of aluminum.
Figure 12:
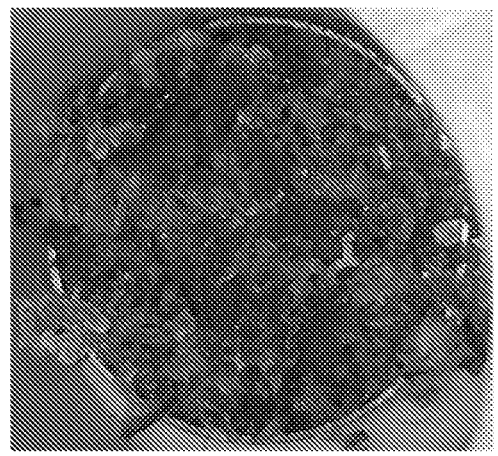
FIG. 12 is an image of the high-surface-area aluminum oxide control sample synthesized from an Al-alloy mixture comprising 20 wt. % of aluminum and exposed to wet $N_2$.
Figure 13:
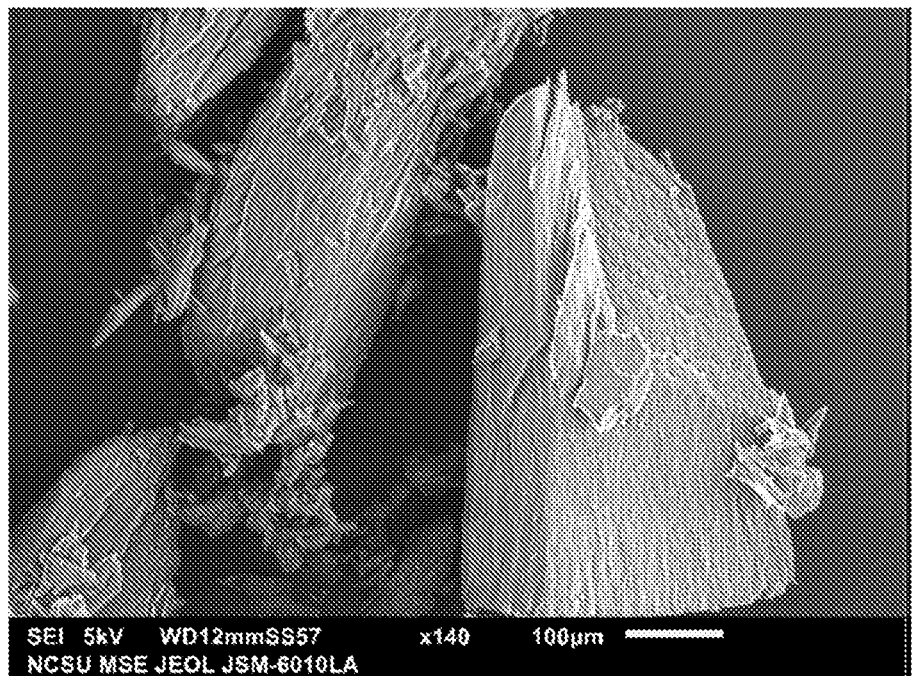
FIG. 13 is a scanning electron microscopy (SEM) of the high-surface-area aluminum oxide synthesized from an Al-alloy mixture comprising 2 wt. % of aluminum.
Figure 14:
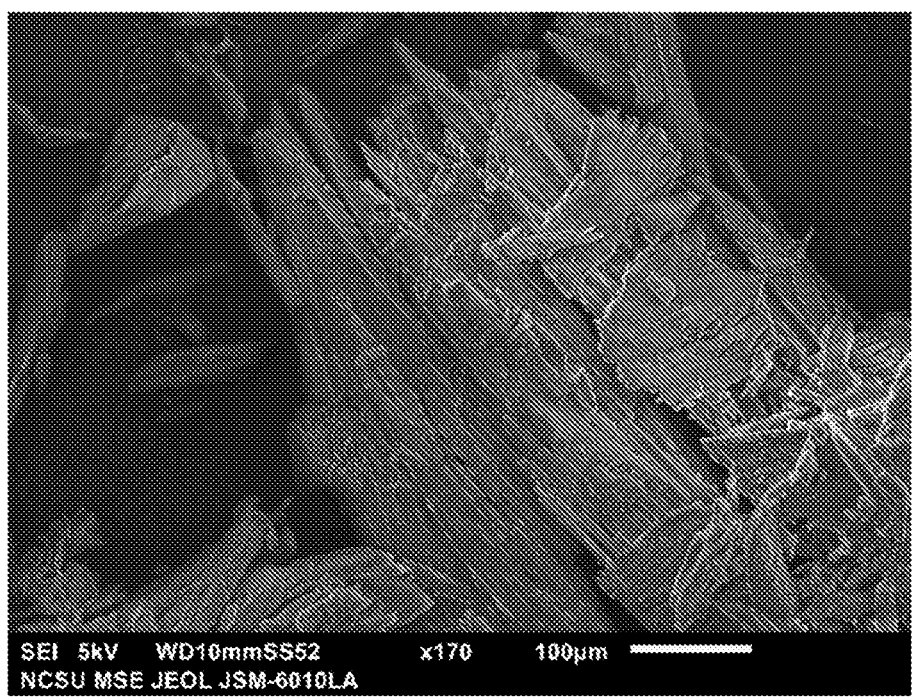
FIG. 14 is a SEM image of the high-surface-area aluminum oxide synthesized from an Al-alloy mixture comprising 10 wt. % of aluminum.
Figure 15:
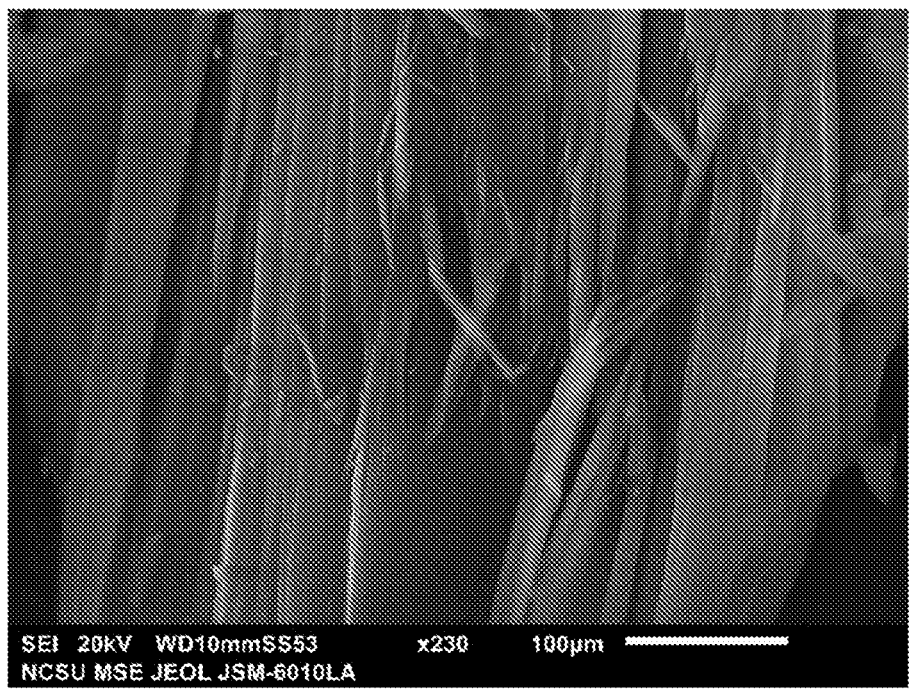
FIG. 15 is a SEM image of the high-surface-area aluminum oxide synthesized from an Al-alloy mixture comprising 20 wt. % of aluminum.
Figure 16:
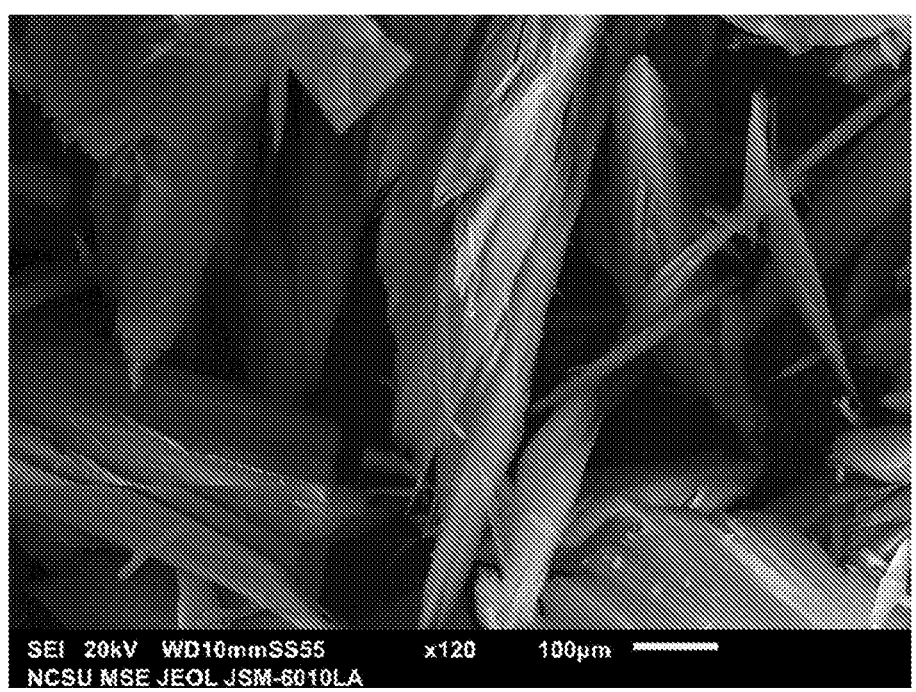
FIG. 16 is a SEM image of the high-surface-area aluminum oxide synthesized from an Al-alloy mixture comprising 30 wt. % of aluminum.
Figure 17:
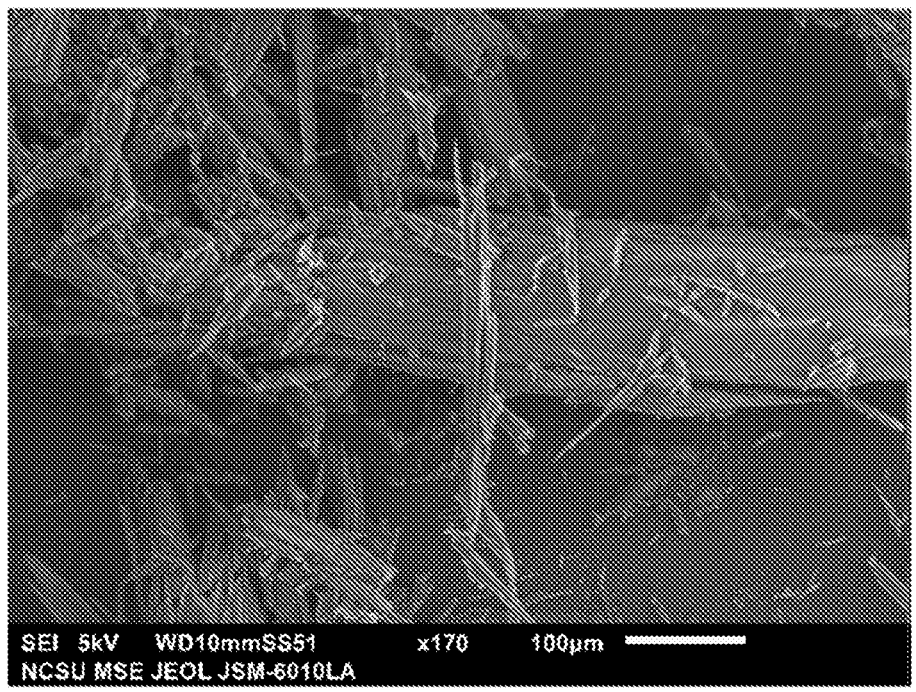
FIG. 17 is a SEM image of the high-surface-area aluminum oxide synthesized from an Al-alloy mixture comprising 40 wt. % of aluminum.
Figure 18:
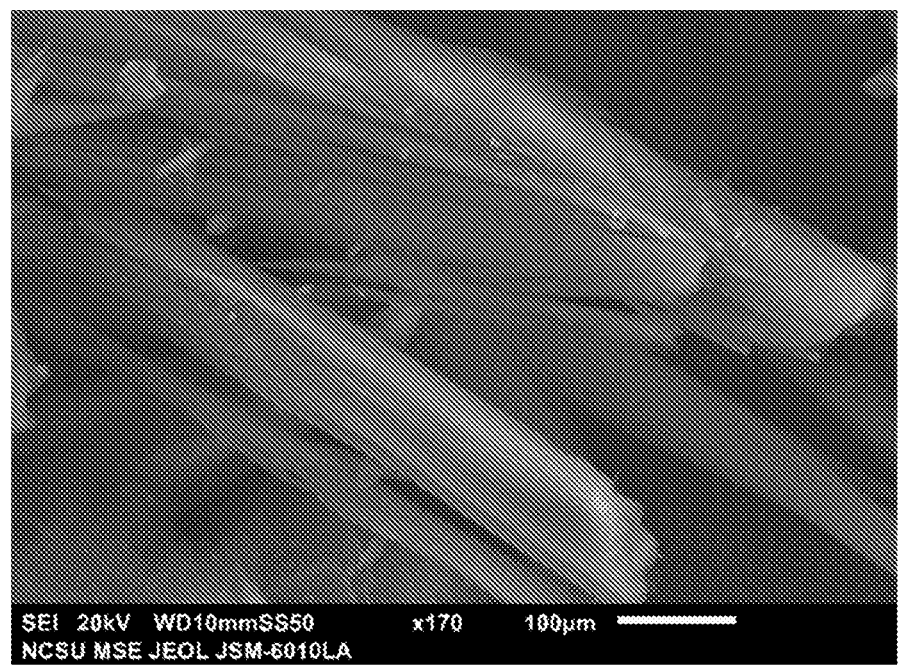
FIG. 18 is a SEM image of the high-surface-area aluminum oxide synthesized from an Al-alloy mixture comprising 60 wt. % of aluminum.
Figure 19:
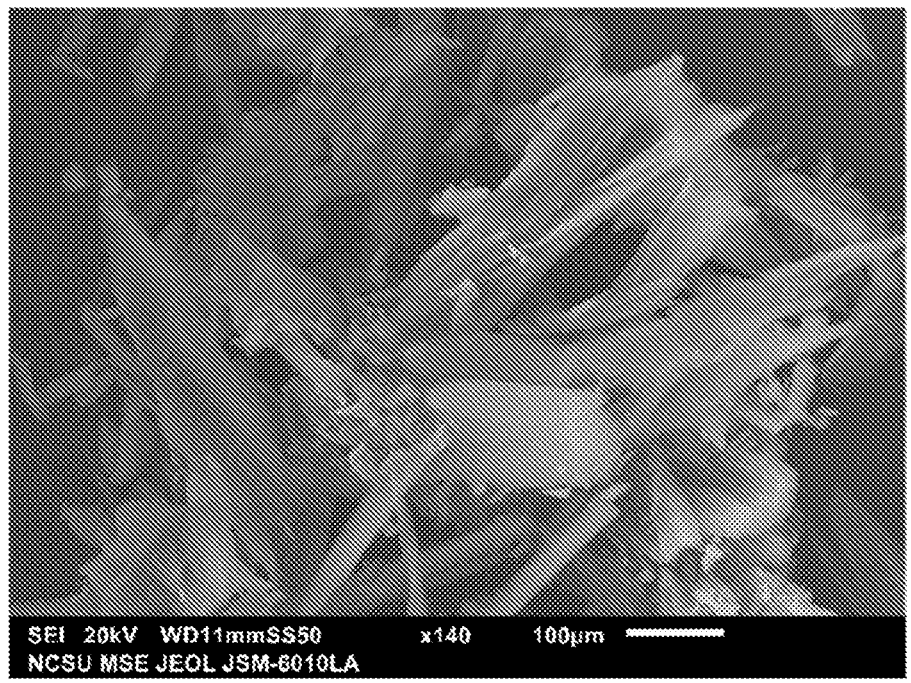
FIG. 19 is a SEM image of the high-surface-area aluminum oxide control sample synthesized from an Al-alloy mixture comprising 20 wt. % of aluminum and exposed to wet $N_2$.

For each synthesis, approximately 1 g of one of the Al-alloy mixtures was placed into a tungsten crucible and spread out as much as possible to maximize the contact with the gas flowing through the chamber. The crucible was then placed and sealed in a chamber (FIG. 5) with the top of the chamber sealed onto the bottom of the chamber by screws and the two valves on the side closed. The chamber was then taken out of the glove box, and one valve was connected to the $H_2O$ vapor, carried by $CO_2$ flowing through a bubbler with deionized $H_2O$, while the other valve was connected to the flow-through apparatus on the IR spectrometer and eventually into a beaker of mineral oil. The valves were then opened and $H_2O$ vapor was flowed through the chamber.

Within a few seconds of flowing $H_2O$ vapor carried by $CO_2$, the mixture in the crucible turned dark, after which solids started to grow out of the mixture. The synthesis was complete after about 4 hours. The crucible was then taken out of the chamber and exposed to air, from which the product (light blue solid) was separated from the unreacted Al and the alloy. The solid growing out of the 2 wt. % Al-alloy mixture was mostly an opaque material that was mainly white in color but with a pale blue tint. The solids growing out of all the other Al-alloy mixtures were light blue and partially transparent, and shaped as whiskers or small chunks. Pictures of products from each Al-alloy mixture are shown in FIG. 6-FIG. 12.

Mid-infrared (400-4000 cm$^{-1}$) spectra of the gases coming out of the chamber were taken periodically during each synthesis with a flow-through apparatus on an IRPrestige-21 Shimadzu Fourier transform infrared spectrophotometer (FTIR) equipped with a GladiATR accessory. For each spectrum, 16 scans were taken with the apodization being Box-Car and the resolution being 0.5.

Two control experiments were performed with approximately 1 g of Al-alloy mixture with 20 wt. % Al. The same synthetic procedure was conducted with $CO_2$ without $H_2O$ vapor (dry $CO_2$ flow) in one experiment and with $N_2$ with $H_2O$ vapor (wet $N_2$ flow) in the other. The 20 wt. % Al-alloy mixture did not react with dry $CO_2$ after 4 hours of $CO_2$ flow, while it reacted with wet $N_2$ immediately, with whisker-shaped blue solid growing out of the mixture, which was the same as the reaction with 20% Al-alloy mixture and $H_2O$ vapor carried by $CO_2$ as shown in FIG. 6-FIG. 12, and thus confirmed that the Al-alloy reacted with the $H_2O$ vapor instead of $CO_2$. The product obtained with wet $N_2$ flow was characterized and annealed in the same way as the other samples.

The structure and crystallinity of each product was measured by powder X-ray diffraction (PXRD), which was carried out on a Rigaku R-Axis Spider using Cu Kα radiation (λ=1.54056 Å) from a sealed tube X-ray source (40 kV, 36 mA) and a curved image-plate detector.

As shown in SEM images (FIG. 13-FIG. 19), all the products have fibrous structures, with the product with 2 wt. % mixture being the most densely packed.

Figure 20:
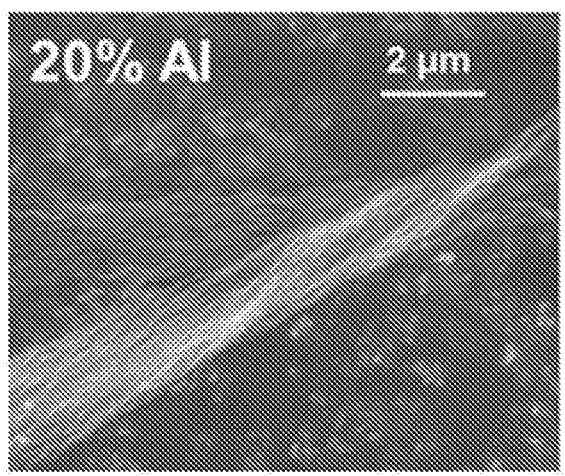
FIG. 20 is a SEM image showing nanofibrous growth (~50-75 nm) of aluminum oxide aerogel from a 20% liquid alloy.
Figure 21:
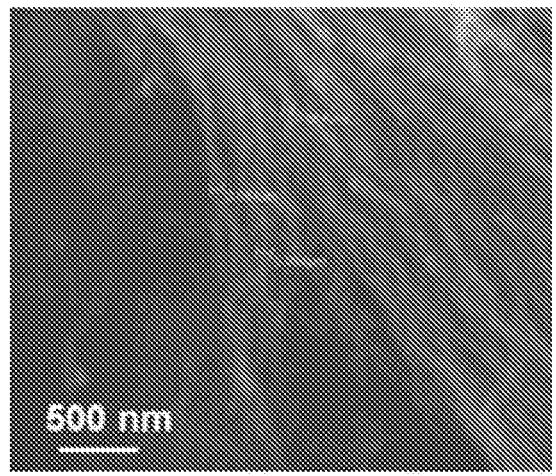
FIG. 21 is a SEM image showing nanofibrous growth (~50-75 nm) of aluminum oxide aerogel from a 20% liquid alloy.
Figure 22:
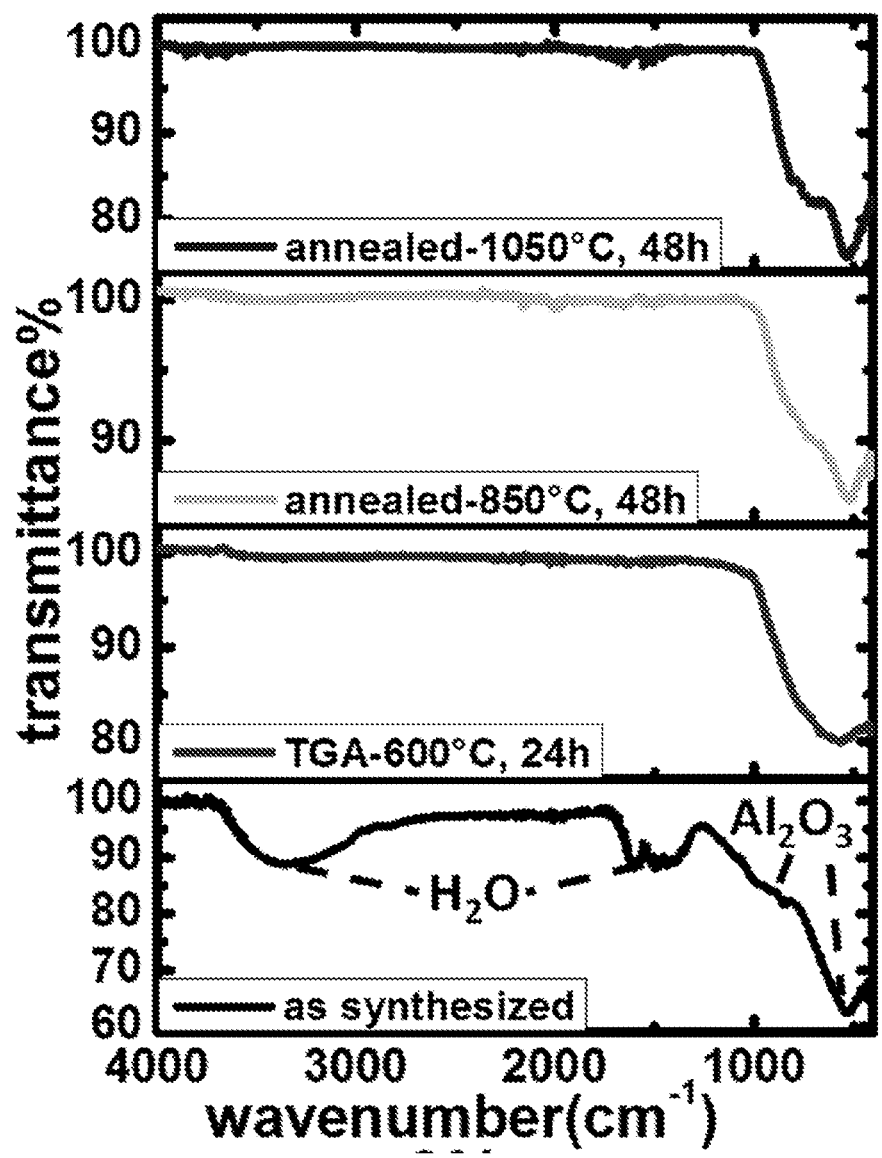
FIG. 22 is the infrared (IR) spectra of the as synthesized, post-TGA analysis, annealed at 850° C. for 48 h, and annealed at 1050° C. for 48 h high-surface-area aluminum oxide synthesized from an Al-alloy mixture comprising 2 wt. % of aluminum. The peaks for Al—O vibration from aluminum oxide and H—O vibration and bent from $H_2O$ are indicated in the spectra for the as synthesized product.
Figure 23:
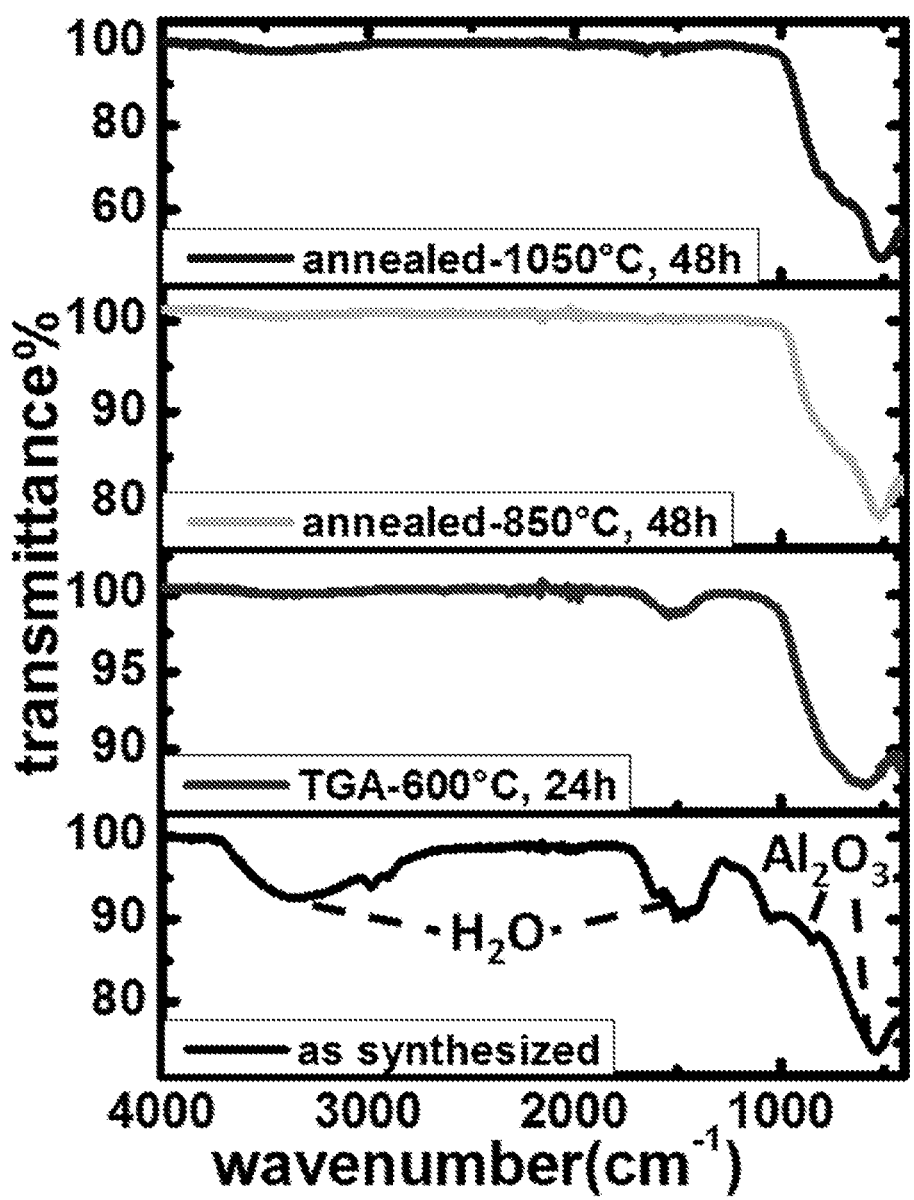
FIG. 23 is the IR spectra of the as synthesized, post-TGA analysis, annealed at 850° C. for 48 h, and annealed at 1050° C. for 48 h high-surface-area aluminum oxide synthesized from an Al-alloy mixture comprising 10 wt. % of aluminum. The peaks for Al—O vibration from aluminum oxide and H—O vibration and bent from $H_2O$ are indicated in the spectra for the as synthesized product.
Figure 24:
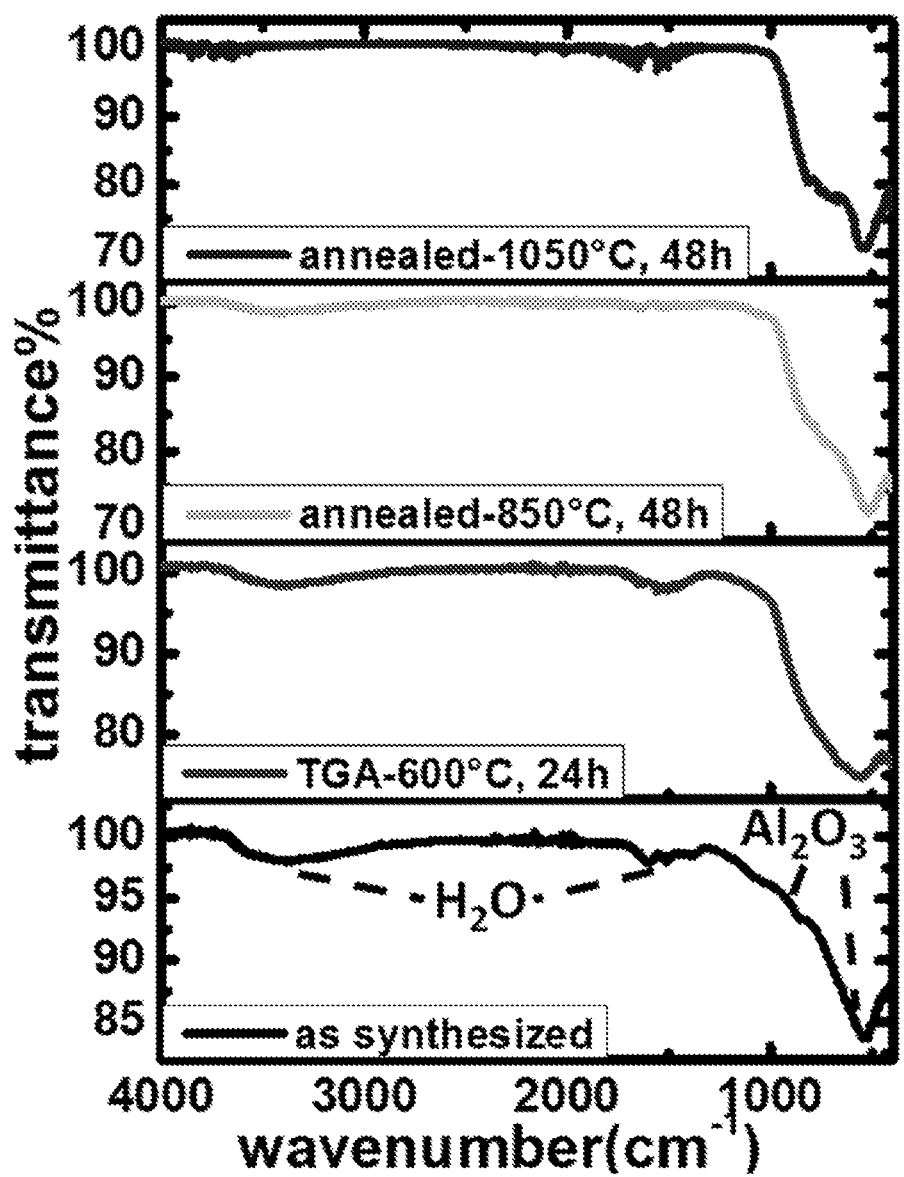
FIG. 24 is the IR spectra of the as synthesized, post-TGA analysis, annealed at 850° C. for 48 h, and annealed at 1050° C. for 48 h high-surface-area aluminum oxide synthesized from an Al-alloy mixture comprising 20 wt. % of aluminum. The peaks for Al—O vibration from aluminum oxide and H—O vibration and bent from $H_2O$ are indicated in the spectra for the as synthesized product.
Figure 25:
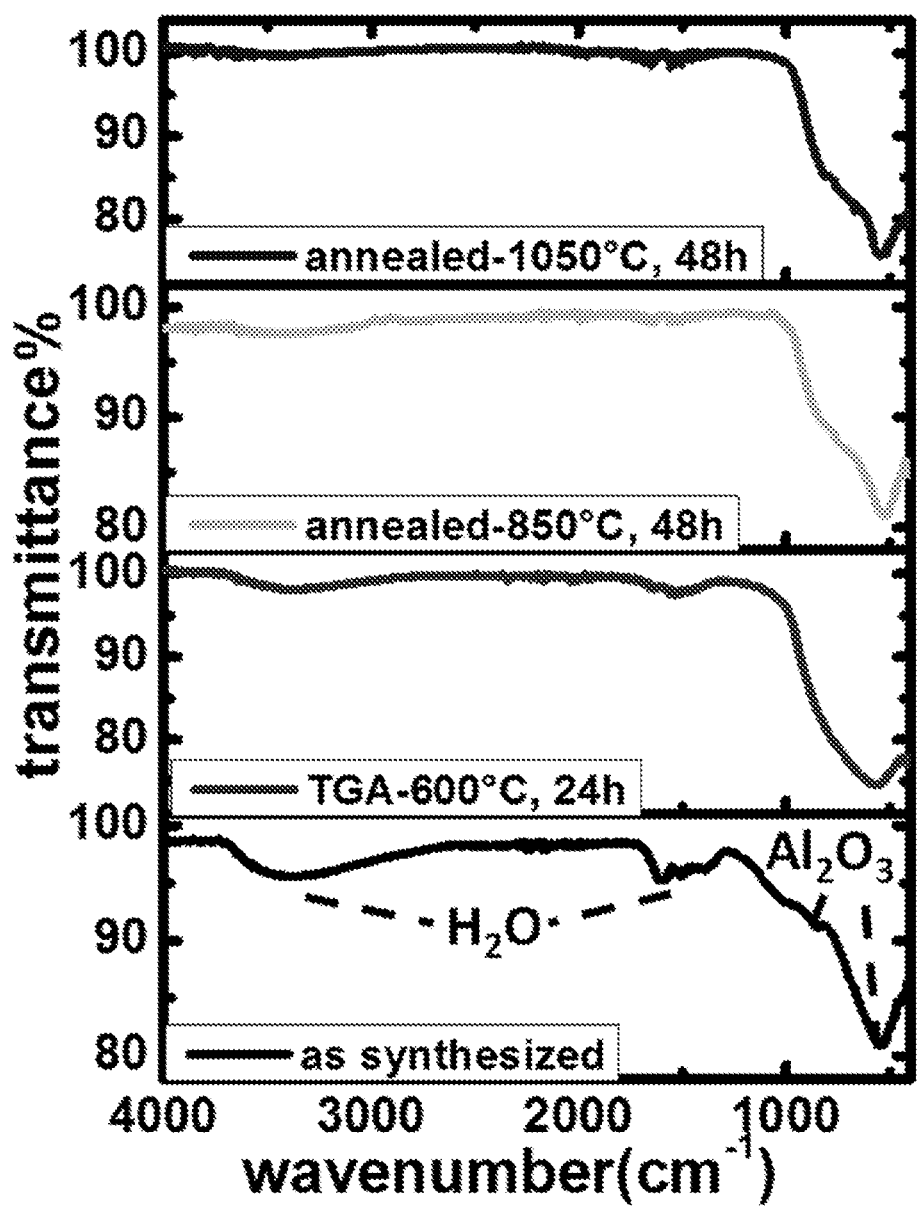
FIG. 25 is the IR spectra of the as synthesized, post-TGA analysis, annealed at 850° C. for 48 h, and annealed at 1050° C. for 48 h high-surface-area aluminum oxide synthesized from an Al-alloy mixture comprising 30 wt. % of aluminum. The peaks for Al—O vibration from aluminum oxide and H—O vibration and bent from $H_2O$ are indicated in the spectra for the as synthesized product.
Figure 26:
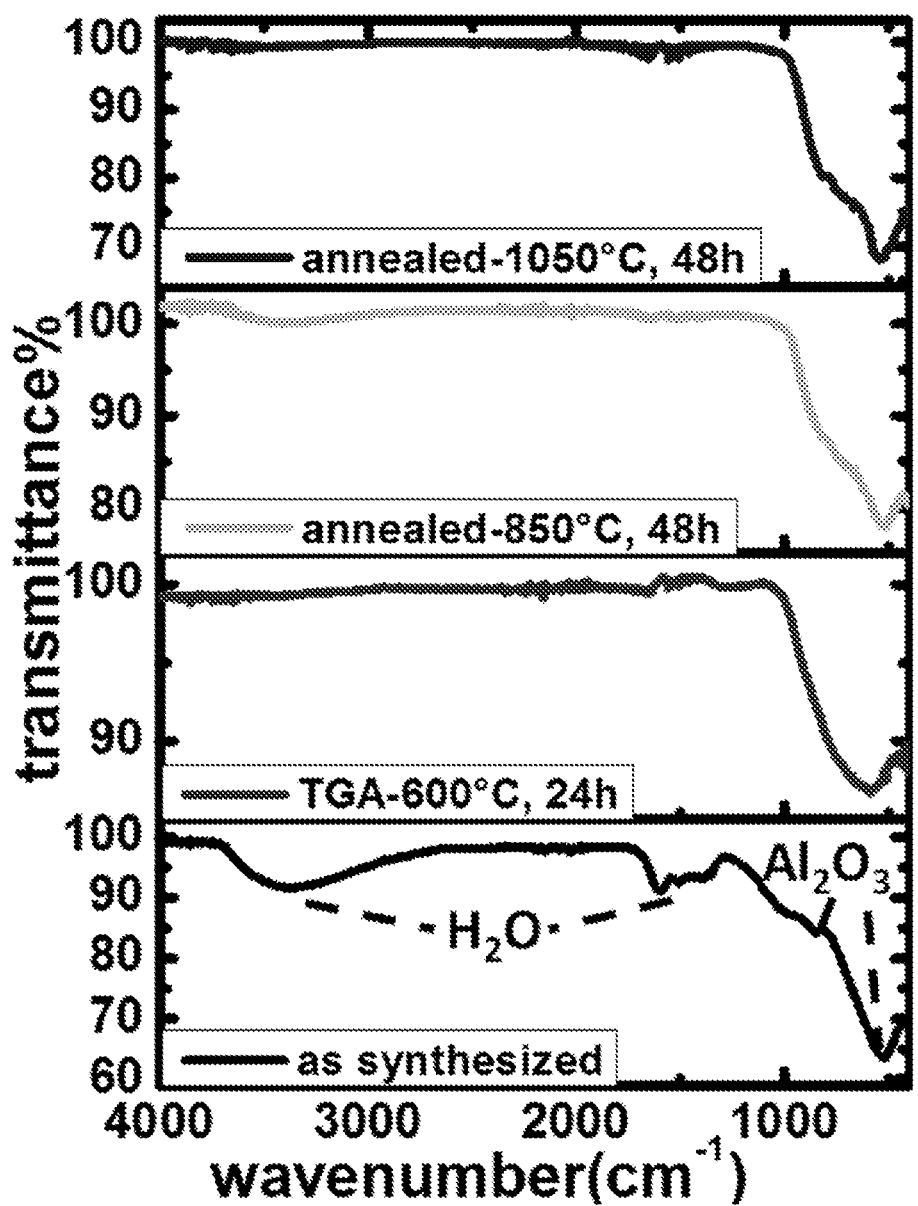
FIG. 26 is the IR spectra of the as synthesized, post-TGA analysis, annealed at 850° C. for 48 h, and annealed at 1050° C. for 48 h high-surface-area aluminum oxide synthesized from an Al-alloy mixture comprising 40 wt. % of aluminum. The peaks for Al—O vibration from aluminum oxide and H—O vibration and bent from $H_2O$ are indicated in the spectra for the as synthesized product.
Figure 27:
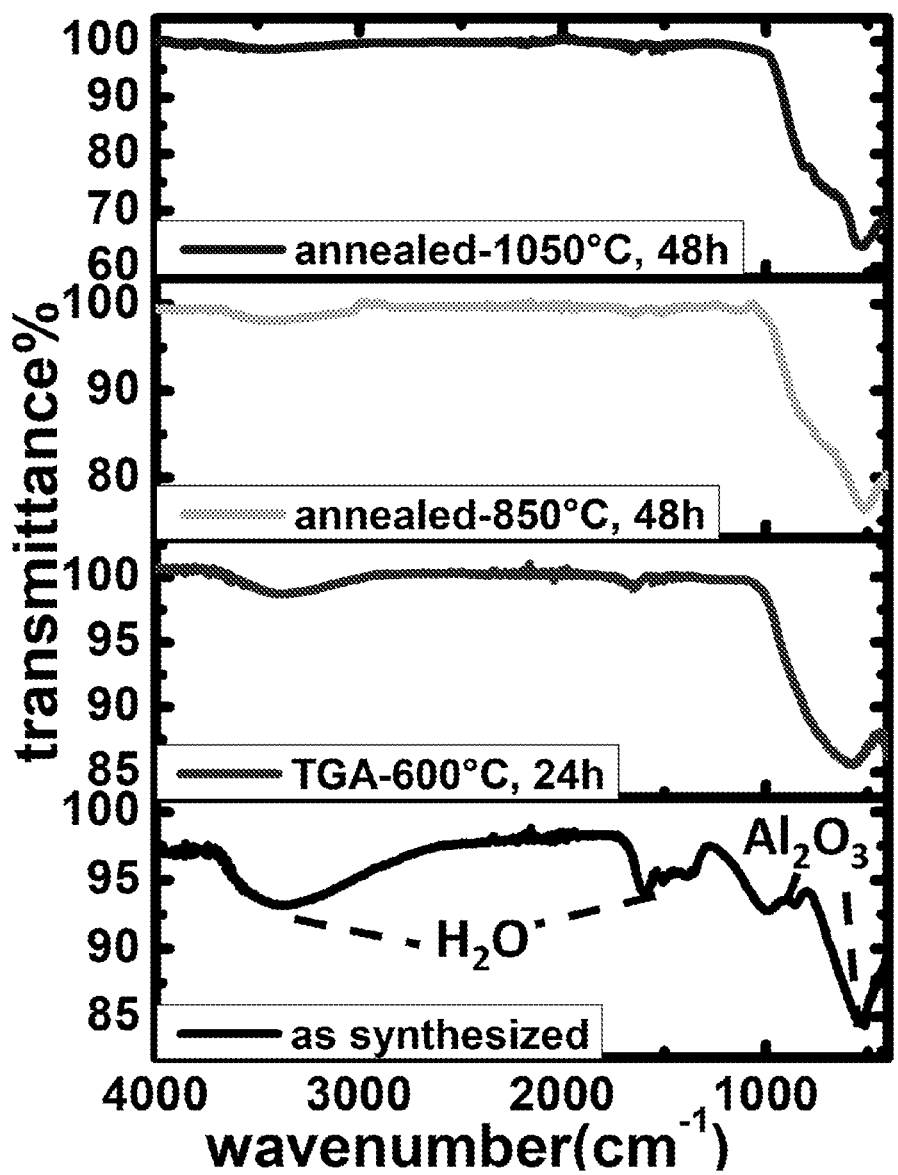
FIG. 27 is the IR spectra of the as synthesized, post-TGA analysis, annealed at 850° C. for 48 h, and annealed at 1050° C. for 48 h high-surface-area aluminum oxide synthesized from an Al-alloy mixture comprising 60 wt. % of aluminum. The peaks for Al—O vibration from aluminum oxide and H—O vibration and bent from $H_2O$ are indicated in the spectra for the as synthesized product.
Figure 28:
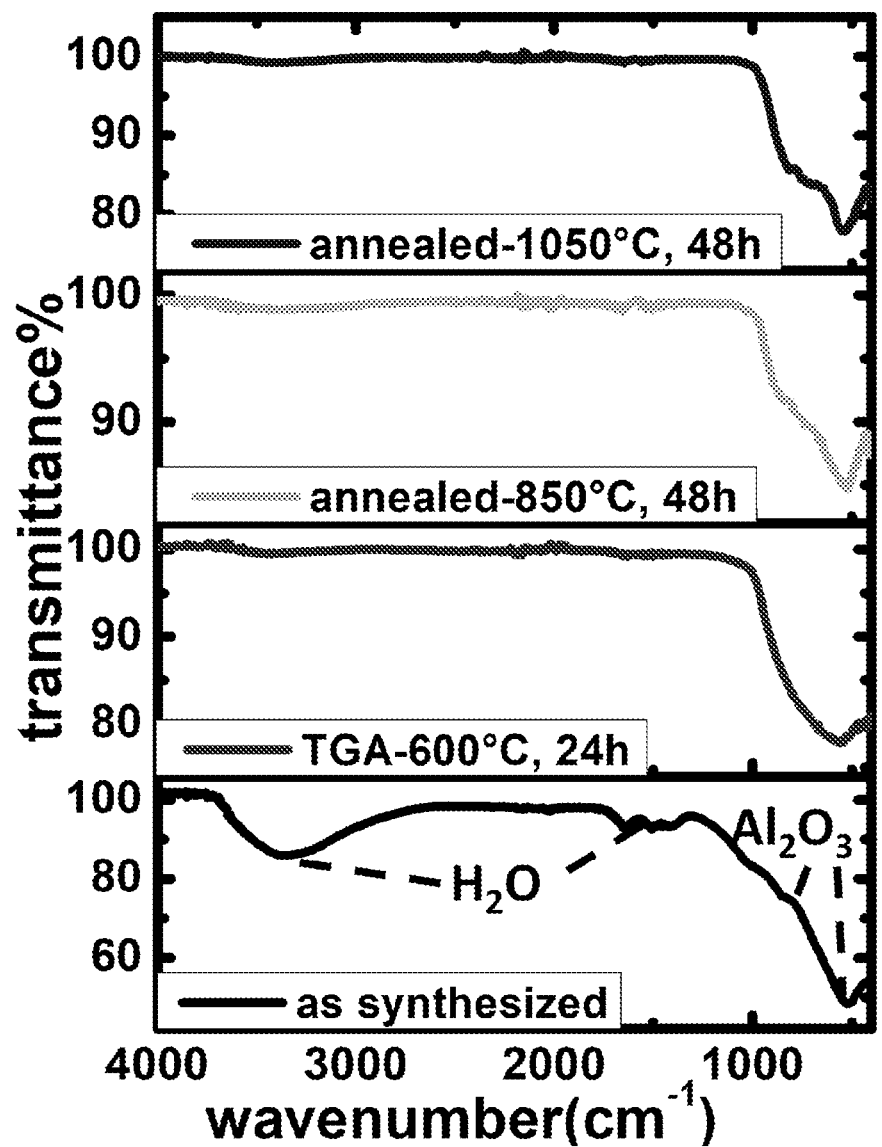
FIG. 28 is the IR spectra of the as synthesized, post-TGA analysis, annealed at 850° C. for 48 h, and annealed at 1050° C. for 48 h high-surface-area aluminum oxide control sample synthesized from an Al-alloy mixture comprising 20 wt. % of aluminum and exposed to wet $N_2$. The peaks for Al—O vibration from aluminum oxide and H—O vibration and bent from $H_2O$ are indicated in the spectra for the as synthesized product.
Figure 29:
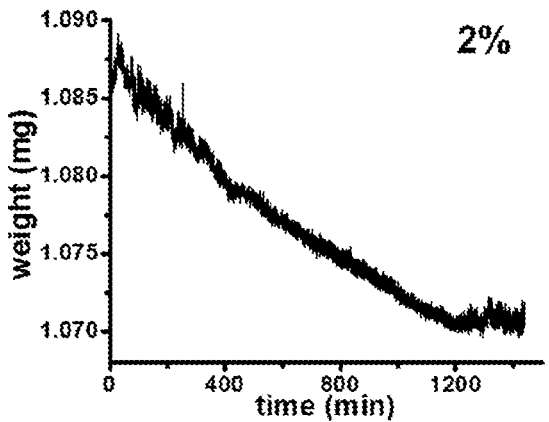
FIG. 29 is the thermogravimetric analysis (TGA) of the high-surface-area aluminum oxide synthesized from an Al-alloy mixture comprising 2 wt. % of aluminum, isothermal at 600° C. for 24 h under nitrogen flow, plotted as weight (%) against time.
Figure 30:
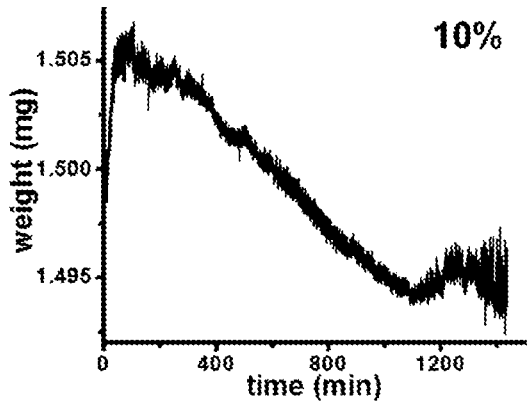
FIG. 30 is the thermogravimetric analysis of the high-surface-area aluminum oxide synthesized from an Al-alloy mixture comprising 10 wt. % of aluminum, isothermal at 600° C. for 24 h under nitrogen flow, plotted as weight (%) against time.
Figure 31:
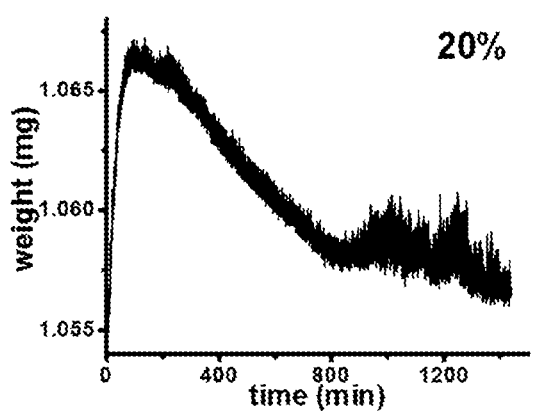
FIG. 31 is the thermogravimetric analysis of the high-surface-area aluminum oxide synthesized from an Al-alloy mixture comprising 20 wt. % of aluminum, isothermal at 600° C. for 24 h under nitrogen flow, plotted as weight (%) against time.
Figure 32:
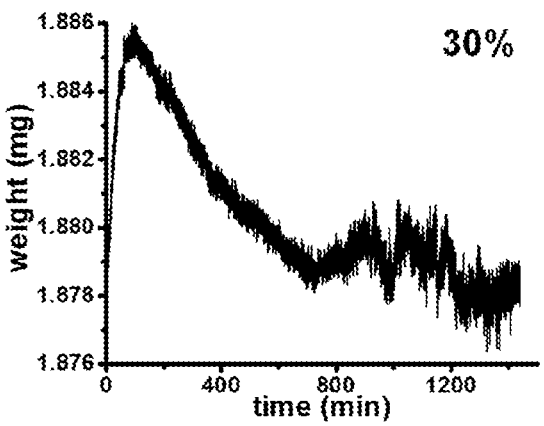
FIG. 32 is the thermogravimetric analysis of the high-surface-area aluminum oxide synthesized from an Al-alloy mixture comprising 30 wt. % of aluminum, isothermal at 600° C. for 24 h under nitrogen flow, plotted as weight (%) against time.
Figure 33:
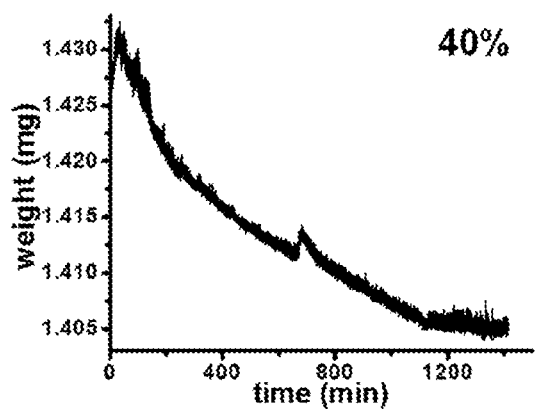
FIG. 33 is the thermogravimetric analysis of the high-surface-area aluminum oxide synthesized from an Al-alloy mixture comprising 40 wt. % of aluminum, isothermal at 600° C. for 24 h under nitrogen flow, plotted as weight (%) against time.
Figure 34:
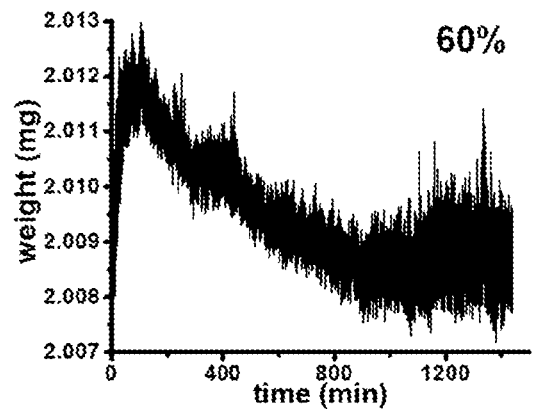
FIG. 34 is the thermogravimetric analysis of the high-surface-area aluminum oxide synthesized from an Al-alloy mixture comprising 60 wt. % of aluminum, isothermal at 600° C. for 24 h under nitrogen flow, plotted as weight (%) against time.
Figure 35:
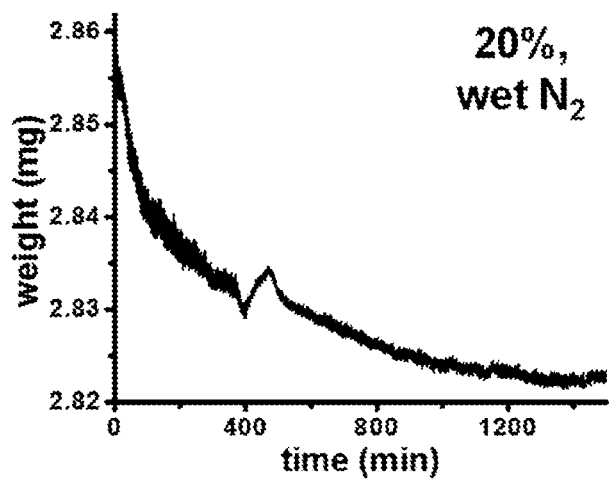
FIG. 35 is the thermogravimetric analysis of the high-surface-area aluminum oxide control sample synthesized from an Al-alloy mixture comprising 20 wt. % of aluminum and exposed to wet $N_2$, isothermal at 600° C. for 24 h under nitrogen flow, plotted as weight (%) against time.
Figure 36:
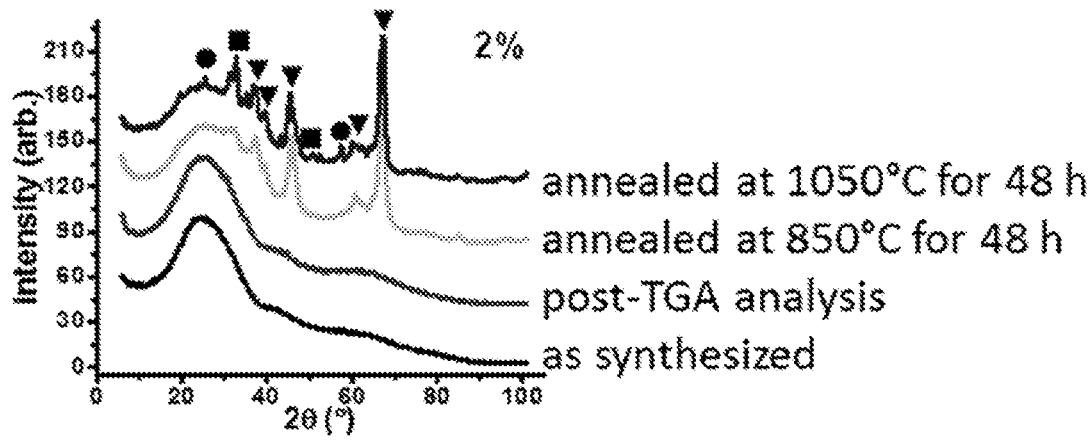
FIG. 36 is the powder X-Ray diffraction (PXRD) patterns of the as synthesized, post-TGA analysis, annealed at 850° C. for 48 h, and annealed at 1050° C. for 48 h high-surface-area aluminum oxide synthesized from an Al-alloy mixture comprising 2 wt. % of aluminum. The γ-, α- and θ-aluminum oxide peaks are indicated in the patterns with triangle, circle and square, respectively.
Figure 37:
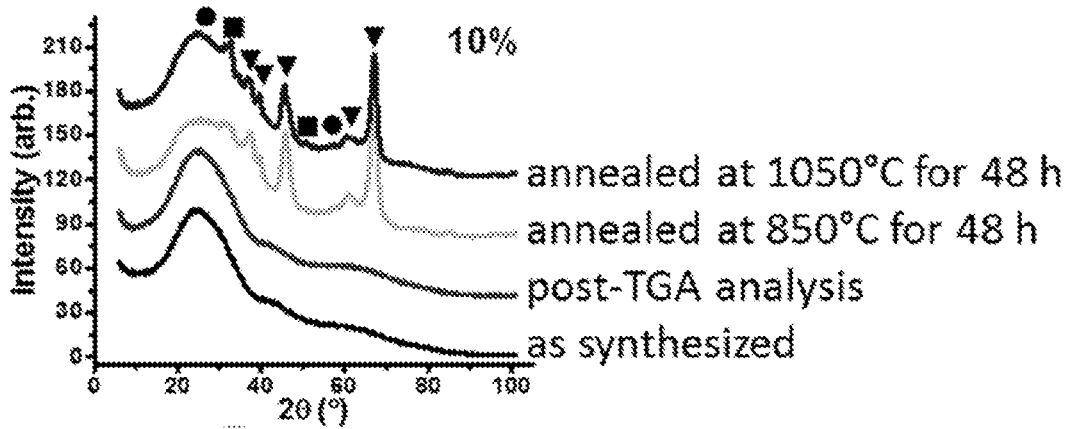
FIG. 37 is the PXRD patterns of the as synthesized, post-TGA analysis, annealed at 850° C. for 48 h, and annealed at 1050° C. for 48 h high-surface-area aluminum oxide synthesized from an Al-alloy mixture comprising 10 wt. % of aluminum. The γ-, α- and θ-aluminum oxide peaks are indicated in the patterns with triangle, circle and square, respectively.
Figure 38:
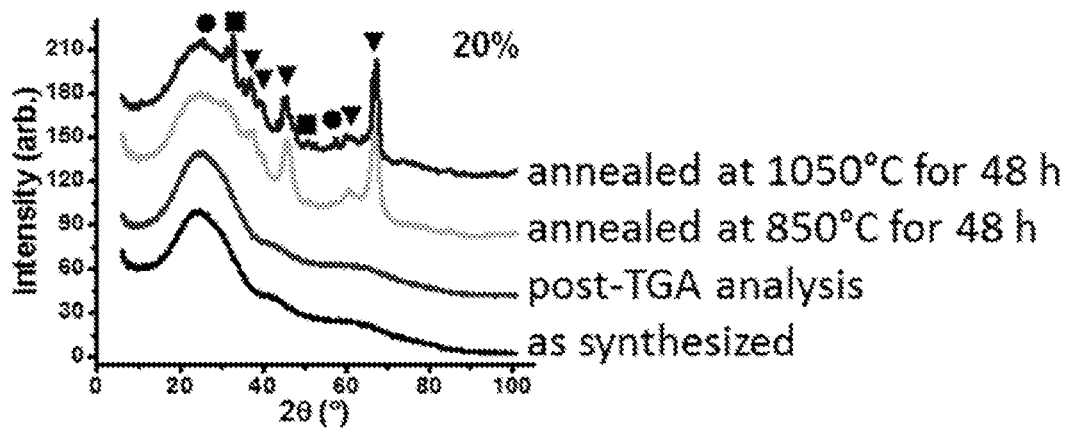
FIG. 38 is the PXRD patterns of the as synthesized, post-TGA analysis, annealed at 850° C. for 48 h, and annealed at 1050° C. for 48 h high-surface-area aluminum oxide synthesized from an Al-alloy mixture comprising 20 wt. % of aluminum. The γ-, α- and θ-aluminum oxide peaks are indicated in the patterns with triangle, circle and square, respectively.
Figure 39:
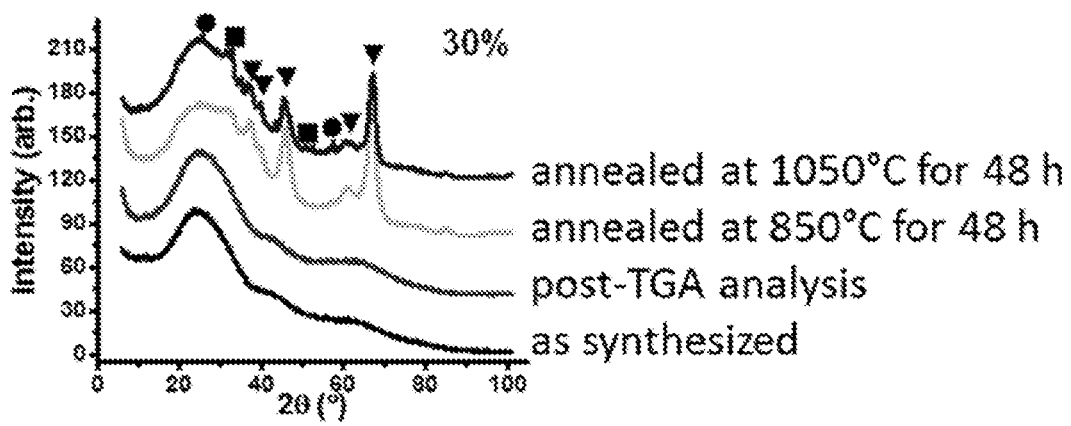
FIG. 39 is the PXRD patterns of the as synthesized, post-TGA analysis, annealed at 850° C. for 48 h, and annealed at 1050° C. for 48 h high-surface-area aluminum oxide synthesized from an Al-alloy mixture comprising 30 wt. % of aluminum. The γ-, α- and θ-aluminum oxide peaks are indicated in the patterns with triangle, circle and square, respectively.
Figure 40:
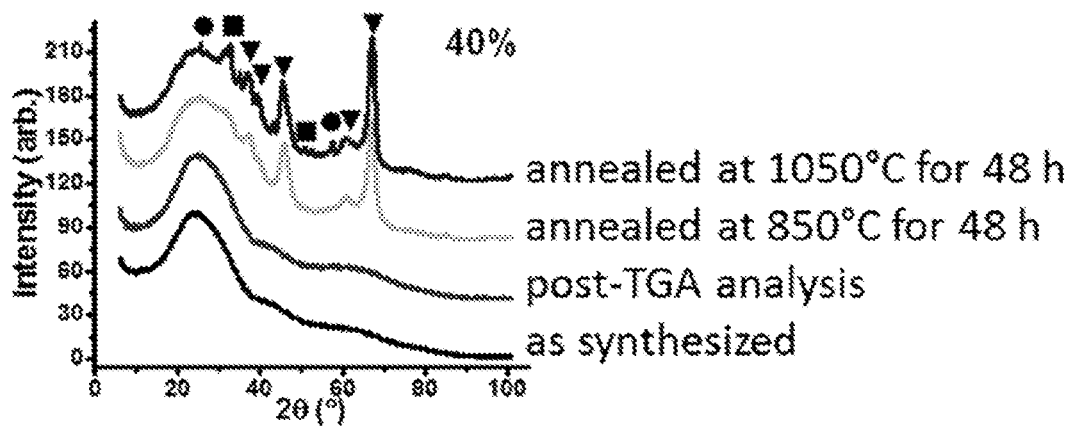
FIG. 40 is the PXRD patterns of the as synthesized, post-TGA analysis, annealed at 850° C. for 48 h, and annealed at 1050° C. for 48 h high-surface-area aluminum oxide synthesized from an Al-alloy mixture comprising 40 wt. % of aluminum. The γ-, α- and θ-aluminum oxide peaks are indicated in the patterns with triangle, circle and square, respectively.
Figure 41:
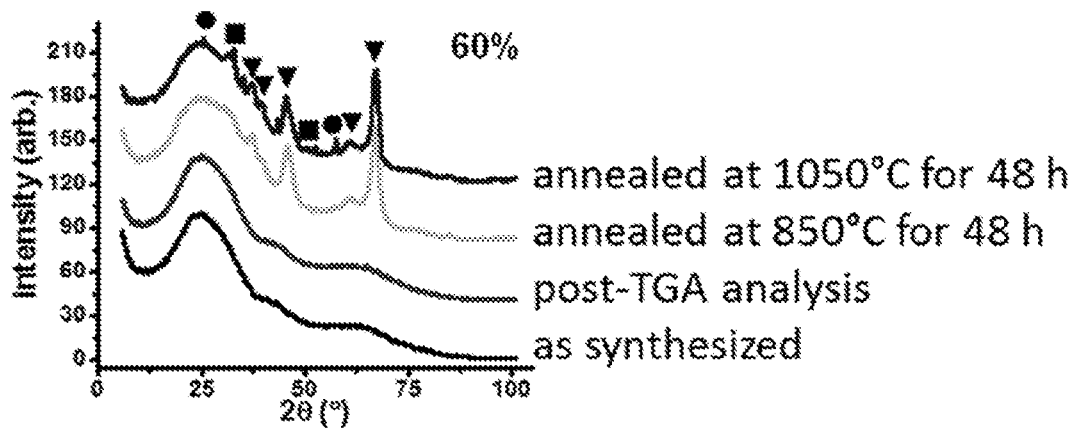
FIG. 41 is the PXRD patterns of the as synthesized, post-TGA analysis, annealed at 850° C. for 48 h, and annealed at 1050° C. for 48 h high-surface-area aluminum oxide synthesized from an Al-alloy mixture comprising 60 wt. % of aluminum. The γ-, α- and θ-aluminum oxide peaks are indicated in the patterns with triangle, circle and square, respectively.
Figure 42:
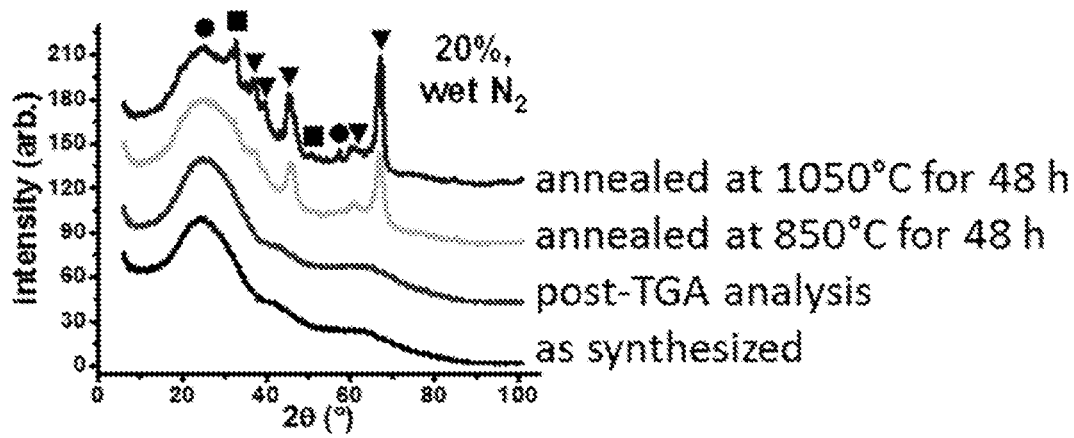
FIG. 42 is the PXRD patterns of the as synthesized, post-TGA analysis, annealed at 850° C. for 48 h, and annealed at 1050° C. for 48 h high-surface-area aluminum oxide control sample synthesized from an Al-alloy mixture comprising 20 wt. % of aluminum and exposed to wet $N_2$. The γ-, α- and θ-aluminum oxide peaks are indicated in the patterns with triangle, circle and square, respectively.

High-resolution electron microscopy images reveal a textured nanofibrous growth of the aluminum oxide, shown in FIG. 20-FIG. 21 for the aerogel grown from the 20% Al liquid alloy. As the aluminum content increased from 2% to 60% in the liquid Ga—In—Sn alloy, the nanofibers became intertwined more densely within the larger bundles.

Elemental analysis (Table 1) show a molar ratio of O/Al between 1 and 2, with an average of 1.47, which indicates an approximately 3:2 ratio of oxygen to aluminum in the formula of the products, i.e. $Al_2O_3$.

TABLE 1

Elemental analysis of the composition of each product: formula number of oxygen and aluminum, the ratio of which are listed on the bottom row.

| wt. % Al | 2% | 10% | 20% | 30% | 40% | 60% | 20% wet $N_2$ |
|---|---|---|---|---|---|---|---|
| O | 45.27 | 43.54 | 56.12 | 49.59 | 54.38 | 55.55 | 56.43 |
| Al | 29.3 | 24.37 | 43.88 | 46.25 | 35.74 | 33.80 | 43.57 |
| mol(O)/mol(Al) | 1.545 | 1.787 | 1.279 | 1.072 | 1.522 | 1.643 | 1.295 |

Mid-infrared (400-4000 cm$^{-1}$) spectra of each product were taken on an FTIR spectrophotometer as described above. 64 scans were taken for each spectrum, with the apodization being Happ-Genzel and the resolution being 4.0. As shown in FIG. 22-FIG. 28, IR spectra of each product show peaks for Al—O stretch, which is characteristic for $Al_2O_3$. Small $H_2O$ peaks were also observed in IR spectra, which can come from either a small amount of $H_2O$ in the samples or $H_2O$ absorbed on the surface of the samples from the air during the transportation of the samples onto the IR spectrophotometer. Thermal analysis was used measure the water content in the high-surface-area aluminum oxide products.

Thermal gravimetric analysis (TGA, TA Instruments Q50) was performed on a TA Instruments TGA Q50 by loading 1-3 mg of each product onto a platinum pan. Under flowing $N_2$, the pan was equilibrated and tared at room temperature, heated at the instrumental maximum heating rate to 600° C. and held isothermally for 24 hours until the weight of the sample stabilized. The water content in the sample was calculated by the weight loss of the sample. The post-heated TGA residues were characterized by IR and PXRD, as described above.

After being heated at 600° C. for 24 hours, little weight loss (<2%) was observed for all the TGA samples (FIG. 29-FIG. 35 and Table 2), which indicates that little water was present in any of the high-surface-area aluminum oxide products. This is consistent with the results of the elemental analysis and the IR spectra. The samples remained amorphous after being heated at 600° C. for 24 hours, as shown in the PXRD patterns in FIG. 36-FIG. 42. Little-to-no $H_2O$ peaks were observed in the IR spectra of the post-TGA samples, as shown in FIG. 22-FIG. 28, indicating that $H_2O$ was indeed evaporated in the TGA measurements. The small $H_2O$ peaks remaining in the IR spectra of the post-TGA samples of the products from the 20 wt. %, 30 wt. %, and 60 wt. % Al-alloy mixtures are likely due to $H_2O$ absorbed on the surface of the samples from the air during the transportation of the samples onto the IR spectrometer.

Two annealing processes were performed consecutively for each product. During the first process, the sample was annealed at 850° C. for 48 h. During the second process, the sample annealed in the first process was further annealed at 1050° C. for 48 h. After each step, the sample was characterized by IR spectroscopy and PXRD as described above.

As shown in FIG. 36-FIG. 42, all the high-surface-area aluminum oxide samples are amorphous as synthesized. After annealing each as-synthesized product at 850° C. for 48 hours, all the high-surface-area aluminum oxide samples turned partially opaque and white. The PXRD patterns of the annealed samples indicate that after annealing at 850° C. for 48 hours, the products became partially crystalline, with γ-$Al_2O_3$ being formed from the amorphous samples (FIG. 36-FIG. 42). After further annealing at 1050° C. for 48 hours, all the high-surface-area aluminum oxide samples turned mostly opaque and white. The PXRD patterns of the further annealed samples indicate that the crystallinity increased in all products, with α- and θ-phases being grown in addition to the γ-$Al_2O_3$ phase (FIG. 36-FIG. 42). This is similar to prior reports that show a high-temperature transformation to the crystalline polymorphs, but without the significant loss of surface area and breakdown of the aerogel material.

IR spectra of the annealed products exhibit only the Al—O stretch peaks, as shown in FIG. 22-FIG. 28, which also provides evidence that the annealed products contain only $Al_2O_3$. The diffraction angles of the broad peaks of the as-synthesized amorphous high-surface-area aluminum oxide remain the same in the annealed products, which provides additional evidence that the as-synthesized and annealed products likely are of the same composition.

Figure 43:
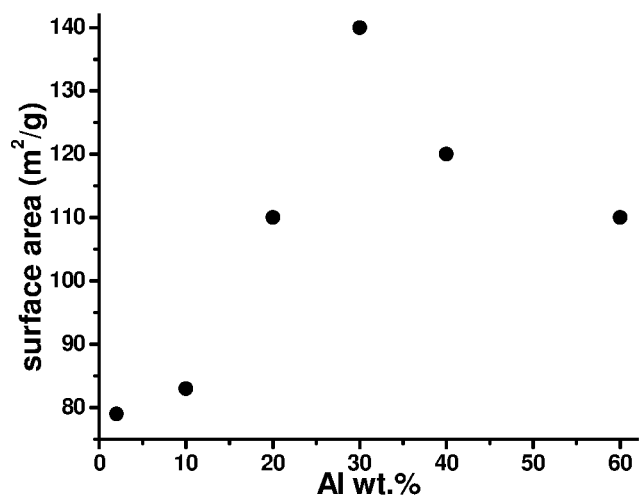
FIG. 43 shows the surface areas of high-surface-area aluminum oxide synthesized with Al-alloy mixtures of different wt. % of Al (data in Table 3).

The specific surface areas of each as-synthesized high-surface-area aluminum oxide samples was measured by the BET surface area measurements on a Quantachrome ChemBET Pulsar TPR/TPD. The samples were degassed by heating to 200° C. under flowing $N_2$ for 4 h, then cooled with liquids nitrogen and analyzed using a 30% He/$N_2$ gas mixture. The results of the specific surface area measurements are shown in FIG. 43 and Table 3. As the wt. % of Al in the Al-alloy mixture increases, the surface area of the product increases first, reaches a maximum, and then decreases, with the product from the 30 wt. % Al-alloy mixture having the highest surface area (140 m$^2$/g), and the product from 2% Al-alloy mixture having the lowest surface area (79 m$^2$/g), among all the products. This is likely due to

TABLE 2

Initial and final weights of the TGA samples, and the calculated ratio of water per $Al_2O_3$ in each sample from the weight loss of the sample.

|  | 2% | 10% | 20% | 30% | 40% | 60% | 20% wet $N_2$ |
|---|---|---|---|---|---|---|---|
| Initial weight (mg) | 1.0854 | 1.5000 | 1.0560 | 1.8823 | 1.4281 | 2.0136 | 2.8603 |
| Final weight (mg) | 1.0712 | 1.4951 | 1.0566 | 1.8783 | 1.4100 | 2.0088 | 2.8234 |
| n($H_2O$)/n($Al_2O_3$) | 0.0750 | 0.0186 | ~0 | 0.0122 | 0.0728 | 0.0133 | 0.0740 | a combination of impacts from the concentration of Al in the mixture and the viscosity of the mixture.

When the concentration of Al is low, the Al-alloy mixture is less viscous. Thus, when the Al in one region of these mixtures reacted and grew into a solid fiber, a region of lower Al concentration is formed, and Al in other parts of the mixture can more easily diffuse into that region and react, which leads to more densely packed fibers and thus lower surface areas of the solid products. For the 2 wt. % and 10 wt. % Al-alloy mixtures, the higher surface tension of the mixtures (i.e., the mixtures are more likely to "ball up") likely also contributes to the more densely packed fibers and thus lower surface areas. As the concentration of Al increases, the mixture becomes more viscous, and thus it is more difficult for Al to diffuse into regions of lower concentration caused by Al being reacted; rather, Al in the mixture is more likely to react where it is, and thus the resulting solid fibers are more loosely packed, leading to higher surface areas of the solid products. However, when the concentration of the Al becomes too high, such as in the cases of the 40 wt. % and the 60 wt. % Al-alloy mixtures, even though it is even less likely for the Al to diffuse in the mixture due to the high viscosity, the high concentration of Al can still result in densely packed fibers, which leads to the decrease in surface areas of the solid products.

TABLE 3

Surface areas of high-surface-area aluminum oxide synthesized with Al-alloy mixtures of different wt. % of Al.

| wt. % Al | 2% | 10% | 20% | 30% | 40% | 60% | 20% wet $N_2$ |
|---|---|---|---|---|---|---|---|
| Surface Area ($m^2/g$) | 79 | 83 | 110 | 140 | 120 | 110 | 110 |

Aluminum oxide with high surface areas was synthesized with flowing water vapor through mixtures of different weight percentage of aluminum dissolved in gallium-indium-tin alloy at ambient temperature and pressure. The as-synthesized high surface area aluminum oxide is a blue-colored solid with fibrous structure, amorphous, and contains mainly aluminum oxide with little water. Upon annealing at 850° C., the amorphous products transformed into $\gamma$-$Al_2O_3$, and further into $\alpha$-$Al_2O_3$ and $\theta$-$Al_2O_3$ upon annealing at 1050° C., which provides further evidence that the high-surface-area solids synthesized contain mainly $Al_2O_3$. As the wt. % of Al in the Al-alloy mixture increases, the surface areas of the as-synthesized aluminum oxide increases, reaches a maximum and then decreases, which is likely an impact of a combination of the concentration of Al and the diffusivity of Al in the Al-alloy mixture. The synthetic method of high-surface-area aluminum oxide presented herein is a non-toxic way to synthesize aluminum oxide aerogel by direct oxidation of Al at ambient temperature and pressure, which can then serve as an absorbent for pollutants, or be doped with transition metals such as nickel to serve as catalysts.

Other advantages which are obvious and which are inherent to the invention will be evident to one skilled in the art. It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

The methods of the appended claims are not limited in scope by the specific methods described herein, which are intended as illustrations of a few aspects of the claims and any methods that are functionally equivalent are intended to fall within the scope of the claims. Various modifications of the methods in addition to those shown and described herein are intended to fall within the scope of the appended claims. Further, while only certain representative method steps disclosed herein are specifically described, other combinations of the method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

What is claimed is:

1. A method of making an aluminum oxide aerogel, the method comprising:
   contacting a solid comprising aluminum with a Ga-based liquid alloy to dissolve at least a portion of the aluminum from the solid, thereby forming an aluminum-alloy mixture; and
   contacting the aluminum-alloy mixture with a fluid comprising water, thereby forming the aluminum oxide aerogel.

2. The method of claim 1, wherein the fluid further comprises $CO_2$ and the method further comprises producing a syngas comprising CO and $H_2$ by contacting the aluminum-alloy mixture with the fluid.

3. The method of claim 1, wherein the solid comprises 85% or more of aluminum.

4. The method of claim 1, wherein the solid comprises an aluminum alloy, such that the solid further comprises one or more alloying elements selected from the group consisting of Mg, Zn, Cu, Fe, Si, Ti, Mn, Cr, and combinations thereof.

5. The method of claim 1, wherein the Ga-based liquid alloy is a liquid at a temperature of from 25° C. to 30° C.

6. The method of claim 1, wherein the Ga-based liquid alloy comprises a Ga—In alloy or a Ga—In—Sn alloy.

7. The method of claim 1, wherein the Ga-based liquid alloy comprises from 60 wt % to 77 wt % Ga, from 10 wt % to 21 wt % In, and 5 wt % to 13 wt % Sn.

8. The method of claim 1, wherein contacting the solid with the Ga-based liquid alloy comprises coating the solid with a thin layer of the Ga-based liquid alloy.

9. The method of claim 1, wherein the aluminum is dissolved at a rate of from $1 \times 10^3$ mg $cm^{-2}$ $h^{-1}$ to $1 \times 10^5$ mg $cm^{-2}$ $h^{-1}$ by the Ga-based liquid alloy.

10. The method of claim 1, wherein the aluminum-alloy mixture comprises from 2 wt % to 60 wt % aluminum.

11. The method of claim 2, wherein the CO and $H_2$ are produced at a molar ratio of $H_2$:CO of from 3:1 to 1:1.

12. The method of claim 2, wherein the $CO_2$ is provided by a waste gas stream.

13. The method of claim 1, wherein the aluminum-alloy mixture is contacted with the fluid at a temperature of from 25° C. to 30° C., at a pressure of from 1 to 10 atm, or a combination thereof.

14. The method of claim 1, wherein the aluminum oxide aerogel has a porosity of 90% or more as measured by BET, a density of 20 mg/$cm^3$ or less, a specific surface area of 100 $m^2$/g or more as measured by BET, or a combination thereof.

15. The method of claim 1, wherein the aluminum oxide aerogel comprises amorphous aluminum oxide.

16. The method of claim 1, wherein the aluminum oxide aerogel comprises 98% or more of aluminum oxide.

17. The method of claim 1, further comprising annealing the aluminum oxide aerogel at a temperature of from 800° C. to 1100° C., wherein the annealed aluminum oxide aerogel comprises crystalline aluminum oxide.

18. The method of claim 1, further comprising separating the Ga-based liquid alloy from the aluminum oxide aerogel, thereby forming a recycled Ga-based liquid alloy.

19. The method of claim 18, wherein the recycled Ga-based liquid alloy is used to contact the solid.

* * * * *